United States Patent
Lee et al.

(10) Patent No.: US 9,581,850 B2
(45) Date of Patent: Feb. 28, 2017

(54) DISPLAY PANEL

(71) Applicant: AU Optronics Corp., Hsin-Chu (TW)

(72) Inventors: Seok-Lyul Lee, Hsin-Chu (TW);
Yi-Ching Chen, Hsin-Chu (TW);
Che-Chia Chang, Hsin-Chu (TW);
Chin-An Tseng, Hsin-Chu (TW);
Yu-Chieh Kuo, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 92 days.

(21) Appl. No.: 14/459,281

(22) Filed: Aug. 13, 2014

(65) Prior Publication Data

US 2015/0108483 A1 Apr. 23, 2015

(30) Foreign Application Priority Data

Oct. 23, 2013 (TW) .............................. 102138264 A

(51) Int. Cl.
| | |
|---|---|
| *G02F 1/1333* | (2006.01) |
| *G02F 1/1335* | (2006.01) |
| *G02F 1/1343* | (2006.01) |
| *G02F 1/1362* | (2006.01) |

(52) U.S. Cl.
CPC .. *G02F 1/133512* (2013.01); *G02F 1/134363* (2013.01); *G02F 1/136213* (2013.01); *G02F 2001/134372* (2013.01)

(58) Field of Classification Search
CPC .............. H01L 27/124; H01L 27/1255; G02F 1/133512; G02F 1/134363; G02F 1/136213; G02F 2001/134372
See application file for complete search history.

(56) References Cited

U.S. PATENT DOCUMENTS

| | | | |
|---|---|---|---|
| 6,465,268 | B2 | 10/2002 | Hirakata |
| 6,642,985 | B2 * | 11/2003 | Kim .................. G02F 1/134363 349/110 |
| 6,678,027 | B2 | 1/2004 | Park |
| 8,482,707 | B2 | 7/2013 | Li |

(Continued)

FOREIGN PATENT DOCUMENTS

| | | |
|---|---|---|
| CN | 101183199 A | 5/2008 |
| CN | 103365002 | 10/2013 |

(Continued)

*Primary Examiner* — Charles Chang
(74) *Attorney, Agent, or Firm* — Locke Lord LLP; Tim Tingkang Xia, Esq.

(57) ABSTRACT

A display panel includes a first substrate structure, a second substrate structure and a non-self-luminous display medium layer. The first substrate structure includes a first substrate, a first common electrode, a pixel electrode and a first alignment film. The second substrate structure is disposed opposite to the first substrate structure. The second substrate structure includes a second substrate, a second common electrode and a second alignment film. The non-self-luminous display medium layer is interposed between the first alignment film and the second alignment film. A first capacitance is formed between the first common electrode and the pixel electrode, a second capacitance is formed between the pixel electrode and the second common electrode, and a ratio of the second capacitance to the first capacitance is substantially between 0.7 and 1.3.

28 Claims, 19 Drawing Sheets

(56) References Cited

U.S. PATENT DOCUMENTS

| | | | |
|---|---|---|---|
| 2008/0030636 A1* | 2/2008 | Huang | G02F 1/136213 349/38 |
| 2009/0085855 A1 | 4/2009 | Hsu | |
| 2009/0109361 A1* | 4/2009 | Ishii | G09G 3/3655 349/39 |
| 2012/0293736 A1* | 11/2012 | Jung | G09G 3/2074 349/37 |
| 2015/0153620 A1* | 6/2015 | Iwata | G02F 1/134309 349/123 |

FOREIGN PATENT DOCUMENTS

| | | |
|---|---|---|
| JP | 2002031812 | 1/2002 |
| JP | 2002082357 | 3/2002 |
| JP | 2007178904 | 7/2007 |
| JP | 2007178907 | 7/2007 |
| TW | 201411250 | 3/2014 |

\* cited by examiner

DISPLAY PANEL

BACKGROUND OF THE DISCLOSURE

1. Field of the Disclosure

The present disclosure relates to a display panel, and more particularly, to a display panel having symmetrical capacitor design with low light leakage.

2. Description of the Related Art

Liquid crystal display (LCD) panel has been widely used in various types of display devices for its advantages such as compact size, good display quality and low power consumption. The conventional LCD panel (e.g. twisted nematic (TN) LCD panel) suffers from the narrow viewing angle problem, and thus the applications of conventional LCD are limited.

In order to address the narrow viewing angle problem of TN LCD panel, several types of wide viewing angle LCD panels such as in-plane switching (IPS) LCD panels and fringe field switching (FFS) LCD panels have been proposed. The conventional IPS LCD panel and the FFS LCD panel have wide viewing angle, but they still suffer from some drawbacks such as low light transmittance, image retention and light leakage.

SUMMARY OF THE DISCLOSURE

It is therefore one of the objectives of the present disclosure to provide a display panel to improve transmittance and to solve image retention and light leakage problems.

An embodiment of the present disclosure provides a display panel comprising a first substrate structure, a second substrate structure and a non-self-luminous display medium layer. The first substrate structure includes a first substrate, a first common electrode, a pixel electrode and a first alignment film. The first common electrode is disposed on the first substrate. The pixel electrode is disposed on the first common electrode, and the pixel electrode and the first common electrode are spaced and separated from each other. The first alignment film is disposed on the pixel electrode. The second substrate structure is disposed opposite to the first substrate structure. The second substrate structure includes a second substrate, a second common electrode and a second alignment film. The second common electrode is disposed on the second substrate. The second alignment film is disposed on the second common electrode. The non-self-luminous display medium layer is disposed between the first alignment film and the second alignment film, wherein a first capacitance exists between the first common electrode and the pixel electrode, a second capacitance exists between the second common electrode and the pixel electrode, and a ratio of the second capacitance to the first capacitance is substantially between 0.7 and 1.3.

The first common electrode, the pixel electrode and the second common electrode of the display panel of this embodiment overlap in the vertical projection direction. When displaying, the voltage difference between the first common voltage of the first common electrode and the pixel voltage of the pixel electrode forms a first capacitance in the dielectric layers therebetween, and the voltage difference between the second common voltage of the second common electrode and the pixel voltage of the pixel electrode forms a second capacitance in the dielectric layers therebetween. The ratio of the second capacitance to the first capacitance (such as second capacitance/first capacitance) is substantially between 0.7 and 1.3. Accordingly, the transmittance and the uniformity of the transmittance distribution are improved, which thus can avoid image retention.

Another embodiment of the present disclosure provides a display panel comprising a first substrate, a second substrate, a non-self-luminous display medium layer, an active switching device, a pixel electrode, a common line, a common electrode and a light-blocking stacking layer. The second substrate is disposed opposite to the first substrate. The non-self-luminous display medium layer is disposed between the first substrate and the second substrate. The signal line is disposed on the first substrate. The active switching device is disposed on the first substrate and electrically connected to the signal line. The pixel electrode is disposed on the first substrate and electrically connected to the active switching device. The common line is disposed on the first substrate. The common electrode is disposed on the first substrate and is electrically connected to the common line, wherein the common electrode and the pixel electrode are spaced from each other, and the pixel electrode and the common electrode together define a light-transmitting region. The light-blocking stacking layer is disposed on the second substrate, wherein the light-blocking stacking layer comprises a transparent electrode layer and a light-shielding layer, and the light-blocking stacking layer overlaps the active switching device, the signal line and the common line in a vertical projection direction but exposes the light-transmitting region in the vertical projection direction.

The display panel of this embodiment includes a light-blocking stacking layer which includes a light-shielding layer and a transparent electrode layer. The light-shielding layer is configured to shielding the light leakage between the common line and the signal line in the front view direction. The transparent electrode layer and the gate electrode of the active switching device have a voltage difference forming a vertical electric field, which can drives the liquid crystal molecules disposed between the transparent electrode layer and the gate electrode to incline. Therefore, the light leakage between the common line and the signal line in the side view direction is shielded. The light-blocking stacking layer is proved to be able to effectively shield light leakage in the dark display mode without affecting the brightness in the bright display mode.

These and other objectives of the present disclosure will no doubt become obvious to those of ordinary skill in the art after reading the following detailed description of the preferred embodiment that is illustrated in the various figures and drawings.

DETAILED DESCRIPTION

To provide a better understanding of the present disclosure, preferred embodiments will be made in detail. The preferred embodiments of the present disclosure are illustrated in the accompanying drawings with numbered elements.

Figure 1:
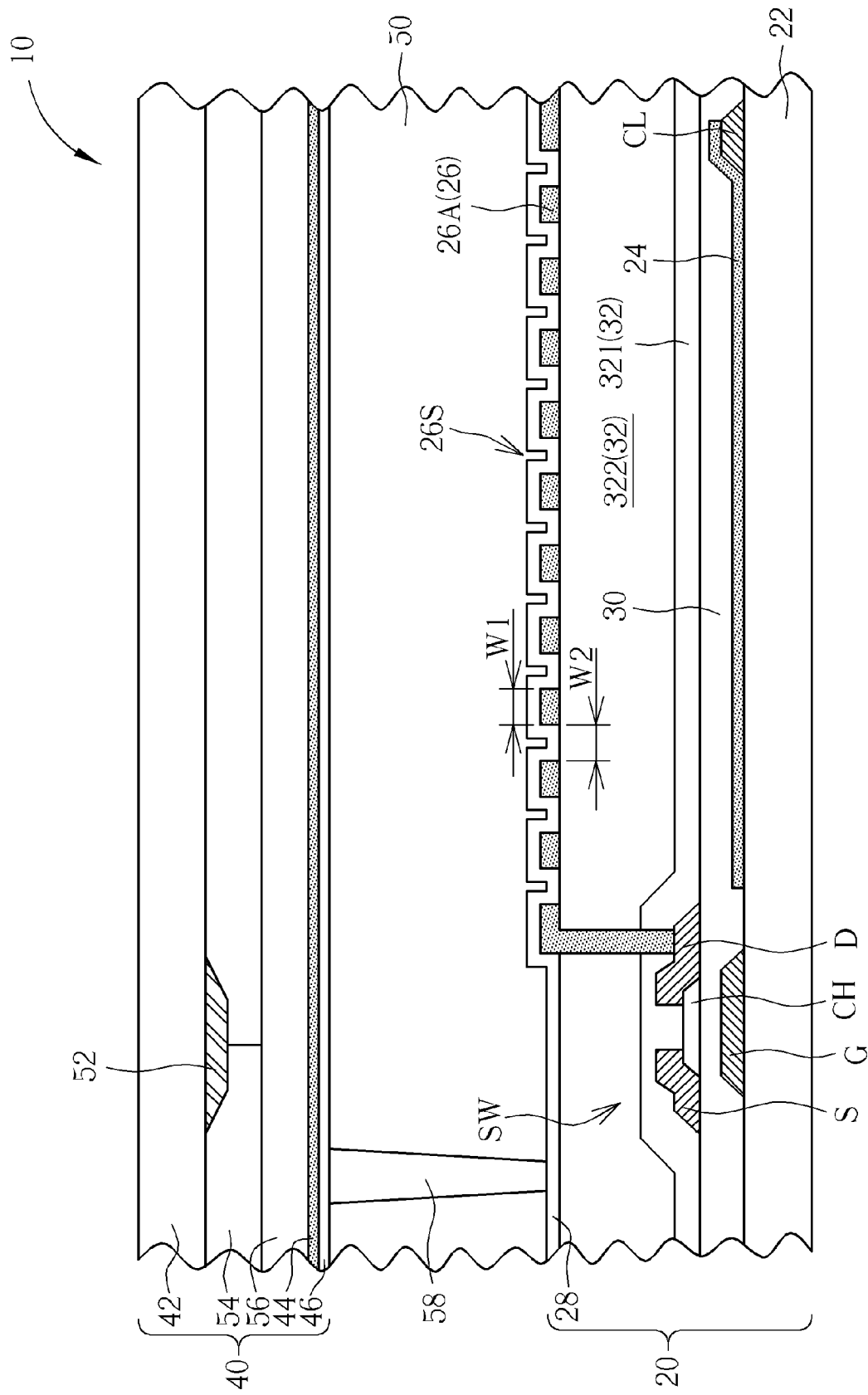
FIG. 1 is a schematic diagram illustrating a display panel according to a first embodiment of the present disclosure.

Refer to FIG. 1. FIG. 1 is a schematic diagram illustrating a display panel according to a first embodiment of the present disclosure. The display panel of this embodiment includes a plurality of pixels, and each pixel includes a plurality of sub-pixels. To highlight the features of the display panel of the present disclosure, only one single sub-pixel is exemplarily drawn in FIG. 1. In addition, an FFS display panel is selected as an example of the display panel in this embodiment, but not limited. As shown in FIG. 1, the display panel 10 of this embodiment includes a first substrate structure 20, a second substrate structure 40 and a non-self-luminous display medium layer 50. The first substrate structure 20 includes a first substrate 22, a first common electrode 24, a pixel electrode 26 and a first alignment film 28. The first common electrode 24 is disposed on the first substrate 22. The pixel electrode 26 is disposed on the first common electrode 24, the pixel electrode 26 and the first common electrode 24 at least partially overlap in a vertical projection direction, and the pixel electrode 26 and the first common electrode 24 are spaced and separated (or namely electrically insulated) from each other. The electrical insulation of the pixel electrode 26 and the first common electrode 24 means that voltage of the pixel electrode 26 is not transmitted to the first common electrode 24 via any conductive wires and voltage of the first common electrode 24 is not transmitted to the pixel electrode 26 via any conductive wires, and preferably, the first common electrode 24 is disposed underneath the pixel electrode 26, but not limited. The first alignment film 28 is disposed on the pixel electrode 26. The second substrate structure 40 is disposed opposite to (or namely is disposed on) the first substrate structure 20. The second substrate structure 40 includes a second substrate 42, a second common electrode 44 and a second alignment film 46. The second common electrode 44 is disposed on the second substrate 42. The second alignment film 46 is disposed on the second common electrode 44. The non-self-luminous display medium layer 50 is disposed between the first alignment film 28 and the second alignment film 46. The first substrate 22 and the second substrate may be transparent substrates, and individually are rigid substrates or flexible substrates such as glass substrates, quartz substrates and plastic substrates, but not limited thereto. The first common electrode 24, the second common electrode 44 and the pixel electrode 26 individually may be single-layered structure or multi-layered structure, and the material of at least one of the aforementioned electrodes may include indium tin oxide (ITO), indium zinc oxide (IZO), aluminum zinc oxide (AZO), aluminum tin oxide (ATO), aluminum indium oxide (AIO), indium oxide (InO), gallium oxide (GaO), carbon nanotube (CNT), nano silver particle, metal having a thickness less than 60 nanometers, alloy having a thickness less than 60 nanometers, transparent organic conductive material or other transparent conductive materials. In this embodiment, the first common electrode 24 and the pixel electrode 26 are disposed corresponding to the sub-pixel, i.e. each sub-pixel has one corresponding first common electrode 24 and one corresponding pixel electrode 26. The first common electrode 24 may be a full surface electrode, which substantially covers the corresponding sub-pixel. The pixel electrode 26 of each sub-pixel can be controlled independently, which may be provided with a different pixel voltage based on the brightness (grayscale) to be displayed. The pixel electrode 26 may be a patterned electrode, which includes a plurality of branches electrodes 26A, and a slit 26S exists between any two adjacent branch electrodes (or namely any two neighbor branch electrodes) 26A. The branch electrodes 26A may be arranged in parallel along the same direction, and electrically connected to each other. Each branch electrode 26A has a first width W1, each slit 26S has a second width W2, and the ratio of the first width W1 to the second width W2 (such as W1:W2) is substantially between 1:1 and 1:3, but not limited thereto. In addition, the second common electrode 44 is preferably a full surface electrode (or namely plane electrode) without any slits, and the second common electrode 44 may substantially covers all of the sub-pixels, but not limited thereto. In an alternative embodiment, the second common electrode 44 may be disposed corresponding to at least one sub-pixel. For example, one second common electrode 44 is corresponding to only one sub-pixel, i.e. one second common electrode 44 overlaps one corresponding sub-pixel in the vertical projection direction. Thus, the numbers of sub-pixels are equal to the numbers of second common electrodes 44. Alternatively, one second common electrode 44 is corresponding to two sub-pixels, i.e. one second common electrode 44 overlaps two corresponding sub-pixels in the vertical projection direction. Thus, the numbers of sub-pixels are twice the numbers of second common electrodes 44. Other correspondences between the numbers of sub-pixels and second common electrodes 44 may be concluded by analogy based on the aforementioned rule.

In this embodiment, the non-self-luminous display medium layer 50 may include a liquid crystal layer such as a nematic liquid crystal layer comprising nematic liquid crystal molecules, but not limited thereto. The liquid crystal layer may be other types of liquid crystal layers. The non-self-luminous display medium layer 50 may include a negative type liquid crystal layer, which has a dielectric anisotropy less than 0. The non-self-luminous display medium layer 50, however, may be a positive type liquid crystal layer or other proper display medium material (e.g. electrophoretic material or electrowetting material). In addition, there exists a cell gap d between the first substrate structure 20 and the second substrate structure 40, that is, the thickness of the non-self-luminous display medium layer 50 is equal to the cell gap d. The non-self-luminous display medium layer 50 has a birefringence $\Delta n$ (unit free), and the product of the cell gap d and the birefringence $\Delta n$ ($\Delta n*d$) is substantially between 0.15 micrometers ($\mu m$) and 0.5 micrometers, but not limited thereto. For example, the birefringence $\Delta n$ of the non-self-luminous display medium layer 50 is substantially between 0.05 and 0.15, but not limited thereto. If the product of the cell gap d and the birefringence $\Delta n$ ($\Delta n*d$) is substantially between 0.15 micrometers and 0.5 micrometers and the birefringence $\Delta n$ of the non-self-luminous display medium layer 50 is approximately equal to 0.05, the cell gap d is substantially between 3 micrometers and 10 micrometers; if the product of the cell gap d and the birefringence $\Delta n$ ($\Delta n*d$) is substantially between 0.15 micrometers and 0.5 micrometers and the birefringence $\Delta n$ of the non-self-luminous display medium layer 50 is approximately equal to 0.15, the cell gap d is substantially between 1 micrometers and 3.33 micrometers. Therefore, the cell gap d may be between 1 micrometers and 10 micrometers, preferably greater than 1 micrometer and less than 5 micrometers, and more preferably greater than 2 micrometers and less than 4.5 micrometers. In this embodiment, the cell gap d of the non-self-luminous display medium layer 50 is substantially 3.2 micrometers, preferably, but not limited thereto. The first alignment film 28 and the second alignment film 46 are configured to provide aligning effect on the non-self-luminous display medium layer 50. The material of the first alignment film 28 and the second alignment film 46 may include, for instance, polyimide (PI), but not limited thereto. In addition, spacers (or namely pillars, or namely columns) 58 may be interposed between the first substrate structure 20 and the second substrate structure 40 as a cushion (or namely buffer) when the display panel 10 is pressed by external force, so that the devices of the display panel 10 will not be damaged and the devices disposed on the first substrate structure 20 and the second substrate structure 40 will not be short-circuited. Also, the spacers 58 are able to maintain the cell gap d.

The first substrate structure 20 may further include an insulation layer 30 and a passivation layer 32. The insulation layer 30 is disposed on the first substrate 22, and the insulation layer 30 is disposed on and covering the first common electrode 24. The insulation layer 30 may be a single-layered or a multi-layered structure, and the material of the insulation layer 30 may include inorganic insulating material such as silicon oxide, silicon nitride or silicon oxynitride, organic insulation material such as photoresist, polyimide (PI), polyester, benzocyclobutene (BCB), polymethylmethacrylate (PMMA), poly(4-vinylphenol) (PVP) and polyvinyl alcohol (PVA), polytetrafluoroethene (PTFE), or other proper insulating materials. The passivation layer 32 is disposed on the insulation layer 30, and the pixel electrode 26 is disposed on the passivation layer 32. In this embodiment, the passivation layer 32 may include a first passivation layer 321 and a second passivation layer 322. The first passivation layer 321 and the second passivation layer 322 may individually be a single-layered or a multi-layered structure, and the material of the first passivation layer 321 and the second passivation layer 322 may independently include inorganic insulating material (e.g. silicon oxide, silicon nitride, silicon oxynitride or other proper inorganic insulating materials), organic insulation material (e.g. transparent photoresist, color photoresist, polyimide (PI), polyester, benzocyclobutene (BCB), polymethylmethacrylate (PMMA), poly(4-vinylphenol) (PVP), polyvinyl alcohol (PVA), polytetrafluoroethene (PTFE) or other proper organic insulating materials) or other proper insulating materials. In this embodiment, the material of the first passivation layer 321 is preferably selected from inorganic insulating materials, while the material of the second passivation layer 322 is preferably selected from low k insulating materials with a dielectric constant, for example, less than 4. The material of the second passivation layer 322 is preferably selected from organic insulating materials, and the pixel electrode 26 is in contact with the organic insulating material. In an alternative embodiment, the insulating material that the pixel electrode 26 contacts may be changed based on different considerations. In addition, the dielectric constant of the first passivation layer 321 is substantially greater than the dielectric constant of the second passivation layer 322, and the dielectric constant of the second passivation layer 322 is substantially less than 5. Preferably, the dielectric constant of the second passivation layer 322 is less than 4, which is substantially less than the dielectric constant of silicon oxide, but not limited thereto. Also, the second passivation layer 322 may have an even top surface, and thus may serve as a planarization layer.

In this embodiment, the first substrate structure 20 may further include an active switching device SW and a common line CL, i.e. the first substrate structure 20 may be an array substrate structure (also referred to a TFT substrate structure). The active switching device SW is disposed on the first substrate 22, and the active switching device SW is electrically connected to the pixel electrode 26. The common line CL is disposed on the first substrate 22 and electrically connected to the common electrode 24. In this embodiment, the first common electrode 24 is in contact with the top surface of the common line CL, but not limited thereto. In an alternative embodiment, the first common electrode 24 and the common line CL may be electrically connected directly or indirectly. In this embodiment, the active switching device SW is a bottom gate TFT device, which includes a gate electrode G, a semiconductor channel CH, a source electrode S and a drain electrode D. The gate electrode G is disposed on the first substrate 22 and electrically connected to a gate line (not shown), and the gate electrode G, the gate line and the common line CL may be made of the same patterned conductive layer e.g. a patterned metal layer or a patterned alloy layer. The common line CL, however, may be made of another patterned conductive layer different from the gate electrode G or the gate line. For example, the common line CL, the source electrode S and the drain electrode D may be made of the same patterned conductive layer e.g. a patterned metal layer or a patterned alloy layer. The insulation layer 30 may further cover the gate electrode G, and serves as a gate insulation layer, but not limited thereto. In an alternative embodiment, the gate insulation layer and the insulation layer 30 may be formed by different insulation layers. The semiconductor channel CH is disposed on the insulation layer 30 and corresponding to the gate electrode G. The material of the semiconductor channel CH may be any suitable semiconductor materials. For example, the semiconductor channel CH may be a single-layered or a multi-layered structure, and the material may include amorphous silicon, polycrystalline silicon, single crystalline silicon, microcrystalline silicon, nanocrystalline silicon, oxide semiconductor material (e.g. IGZO, IGO, IZO, ITO, TiO, ZnO, InO, GaO), organic semiconductor material or other suitable semiconductor materials. The source electrode S and the drain electrode D are disposed on two opposite sides of the semiconductor channel CH and partially overlap the semiconductor channel CH respectively. The source electrode S is electrically connected to a data line (not shown), and the drain electrode D is electrically connected to the pixel electrode 26. The source electrode S and the drain electrode D may be made of the same patterned conductive layer e.g. a patterned metal layer, but not limited thereto. In an alternative embodiment, the active switching device SW may be a top gate TFT device, in which the semiconductor channel CH is disposed underneath the gate electrode G and the gate insulation layer, and the gate insulation layer is disposed between the semiconductor channel CH and the gate electrode G. In still another alternative embodiment, the active switching device SW may be other suitable active switching devices.

The second substrate structure 40 may further include at least one of the following devices including a light-shielding pattern 52, a color filter layer 54 and an overcoat layer 56 disposed on the second substrate 42. In this embodiment, the second substrate structure 40 includes all of the three above devices, which makes the second substrate structure 40 a color filter (CF) substrate structure. The light-shielding pattern 52 may be, for instance, a black matrix (BM) configured to shield light leakage. The color filter layer 54 may include color filter patterns configured to filter different colors, e.g. red color filter pattern, green color filter pattern and blue color filter pattern disposed in different sub-pixels. The overcoat layer 56 is disposed between the color filter layer 54 and the second common electrode 44. In other alternative embodiments, the color filter layer 54 may be disposed on the first substrate 22. For example, the color filter layer 54 is disposed on the first substrate 22, replacing the second passivation layer 322, the color filter layer 54 is disposed on the passivation layer 32 or the color filter layer 54 is disposed under the passivation layer 32. The light-shielding pattern 52 may be disposed on the passivation layer 32 and between two color filter patterns of the color filter layer 54.

The display panel 10 of this embodiment has substantially symmetrical capacitor design. Specifically, when displaying, the first common electrode 24 has a first common voltage, the pixel electrode 26 has a pixel voltage and the second common electrode 44 has a second common voltage. The pixel electrodes 26 of the sub-pixels have different pixel voltages based on the desired brightness (grayscale) to be displayed, and the first common voltage and the second common voltage may be substantially the same but not limited thereto. When displaying, a first capacitance exists between the first common electrode 24 and the pixel electrode 26, and a second capacitance exists between the second common electrode 44 and the pixel electrode 26, where the ratio of the second capacitance to the first capacitance (i.e. the second capacitance divided by the first capacitance, such as second capacitance/first capacitance) is substantially between 0.7 and 1.3; preferably, the ratio of the second capacitance to the first capacitance is substantially greater than 0.9 and less than 1.1; and most preferably, the ratio of the second capacitance to the first capacitance is substantially equal to 1. By virtue of the substantially symmetrical capacitor design, the transmittance and the uniformity of the transmittance distribution are improved, which thus can avoid image retention.

Figure 2:
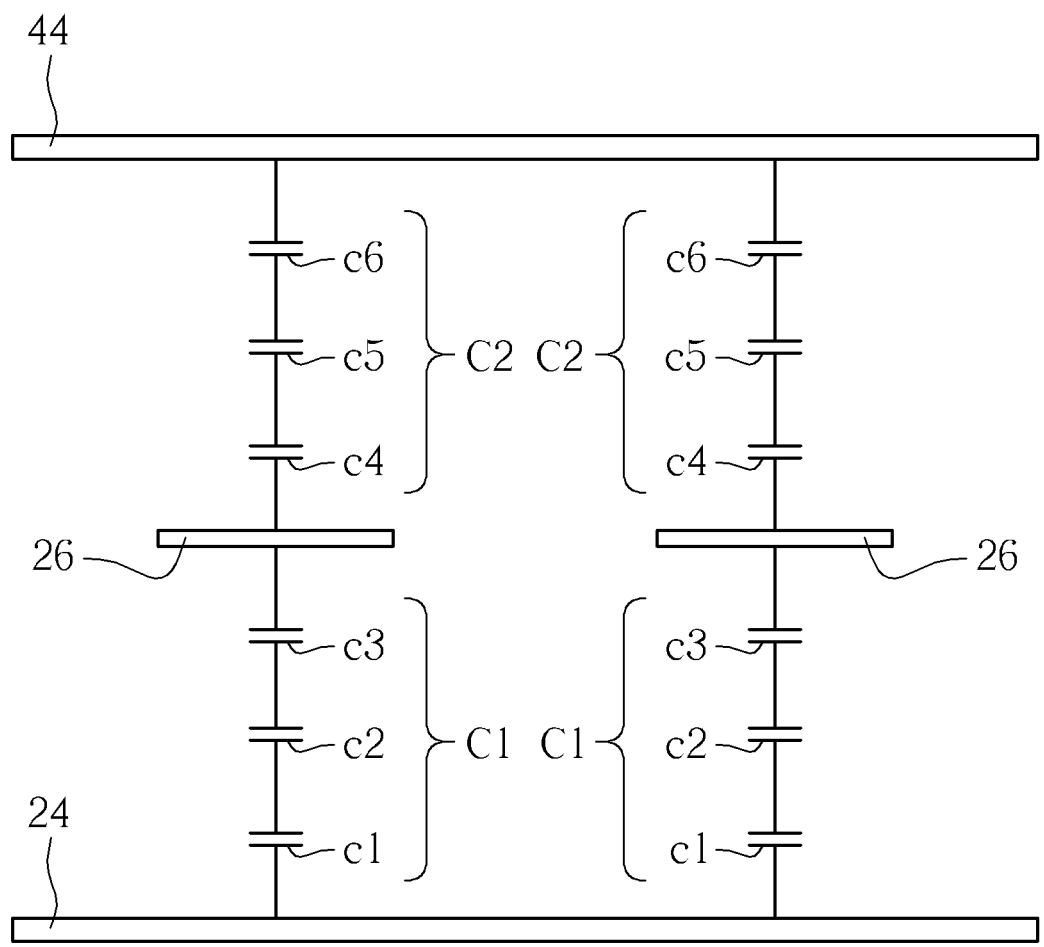
FIG. 2 is an equivalent circuit diagram of the display panel of FIG. 1.

Refer to FIG. 2, as well as FIG. 1. FIG. 2 is an equivalent circuit diagram of the display panel of FIG. 1. As shown in FIG. 1 and FIG. 2, in the display panel 10, an equivalent capacitor exists in an insulation layer or a dielectric layer disposed between any two electrodes with a voltage difference by definition. Thus, the insulation layer 30 has a first sub-capacitor c1, the first passivation layer 321 has a second sub-capacitor c2, the second passivation layer 322 has a third sub-capacitor c3, the first sub-capacitor c1, the second sub-capacitor c2 and the third sub-capacitor c3 are connected in series between the first common electrode 24 and the pixel electrode 26, and the equivalent capacitance sum of the first sub-capacitor c1, the second sub-capacitor c2 and the third sub-capacitor c3 are substantially equal to the first capacitance C1. Since the first sub-capacitor c1, the second sub-capacitor c2 and the third sub-capacitor c3 are connected in series, the first capacitance C1 can be calculated by the following formula: $C1=1/(1/c1+1/c2+1/c3)$. By the same analogy, the first alignment film 28 has a fourth sub-capacitor c4, the non-self-luminous display medium layer 50 has a fifth sub-capacitor c5, the second alignment film 46 has a sixth sub-capacitor c6, the fourth sub-capacitor c4, the fifth sub-capacitor c5 and the sixth sub-capacitor c6 are connected in series between the pixel electrode 26 and the second common electrode 44, and the equivalent capacitance sum of the fourth sub-capacitor c4, the fifth sub-capacitor c5 and the sixth sub-capacitor c6 are substantially equal to the second capacitance C2. Since the fourth sub-capacitor c4, the fifth sub-capacitor c5 and the sixth sub-capacitor c6 are connected in series, the second capacitance C2 can be calculated by the following formula: $C2=1/(1/c4+1/c5+1/c6)$. In this embodiment, the ratio of the second capacitance C2 to the first capacitance C1 (i.e. the second capacitance C2/the first capacitance C1) is substantially between 0.7 and 1.3; preferably, the ratio of the second capacitance C2 to the first capacitance C1 (i.e. the second capacitance C2/the first capacitance C1) is substantially greater than 0.9 and less than 1.1; and most preferably, the ratio of the second capacitance C2 to the first capacitance C1 (i.e. the second capacitance C2/the first capacitance C1) is substantially equal to 1.

In this embodiment, the capacitances of the first sub-capacitor c1, the second sub-capacitor c2, the third sub-capacitor c3, the fourth sub-capacitor c4, the fifth sub-capacitor c5 and the sixth sub-capacitor c6 are basically determined by the dielectric constant and the thickness of the insulation layer 30, the first passivation layer 321, the second passivation layer 322, the first alignment film 28, the non-self-luminous display medium layer 50 and the second alignment film 46. Thus, by modifying the dielectric constant (i.e. the material) and the thickness of the aforementioned layers, the ratio of the second capacitance C2 to the first capacitance C1 (i.e. the second capacitance C2/the first capacitance C1) may be controlled to be substantially between 0.7 and 1.3; preferably, the ratio of the second capacitance C2 to the first capacitance C1 (i.e. the second capacitance C2/the first capacitance C1) may be controlled to be substantially greater than 0.9 and less than 1.1; and most preferably, the ratio of the second capacitance C2 to the first capacitance C1 (i.e. the second capacitance C2/the first capacitance C1) may be controlled to be substantially equal to 1. For example, the dielectric constant (unit free) of the insulation layer 30 is substantially between 2 and 8 e.g. approximately 4, and the thickness of the insulation layer 30 is substantially between 1000 angstroms and 3000 angstroms e.g. approximately 2000 angstroms. The dielectric constant of the first passivation layer 321 is substantially between 4 and 8 e.g. approximately 5.4, and the thickness of the first passivation layer 321 is substantially between 1000 angstroms and 3000 angstroms e.g. approximately 2000 angstroms. The dielectric constant of the second passivation layer 322 is substantially between 2 and 4 e.g. approximately 3.2, and the thickness of the second passivation layer 322 is substantially between 20,000 angstroms and 40,000 angstroms e.g. approximately 30,000 angstroms. The dielectric constant of the first alignment film 28 is substantially between 2.5 and 4 e.g. approximately 3, and the thickness of the first alignment film 28 is substantially between 500 angstroms and 1500 angstroms e.g. approximately 800 angstroms. The dielectric constant of the non-self-luminous display medium layer 50 is substantially between 3 and 12 e.g. approximately 3.5, and the thickness of the non-self-luminous display medium layer 50 is substantially between 10,000 angstroms and 100,000 angstroms, preferably greater than 20,000 angstroms and less than 45,000 angstroms, and more preferably equal to approximately 32,000 angstroms. The dielectric constant of the second alignment film 46 is substantially between 2.5 and 4 e.g. approximately 3, and the thickness of the second alignment film 46 is substantially between 500 angstroms and 1500 angstroms e.g. approximately 800 angstroms.

The display panel is not limited by the aforementioned embodiment, and may have other different preferred embodiments. To simplify the description, the identical components in each of the following embodiments are marked with identical symbols. For making it easier to compare the difference between the embodiments, the following description will detail the dissimilarities among different embodiments and the identical features will not be redundantly described.

Figure 3:
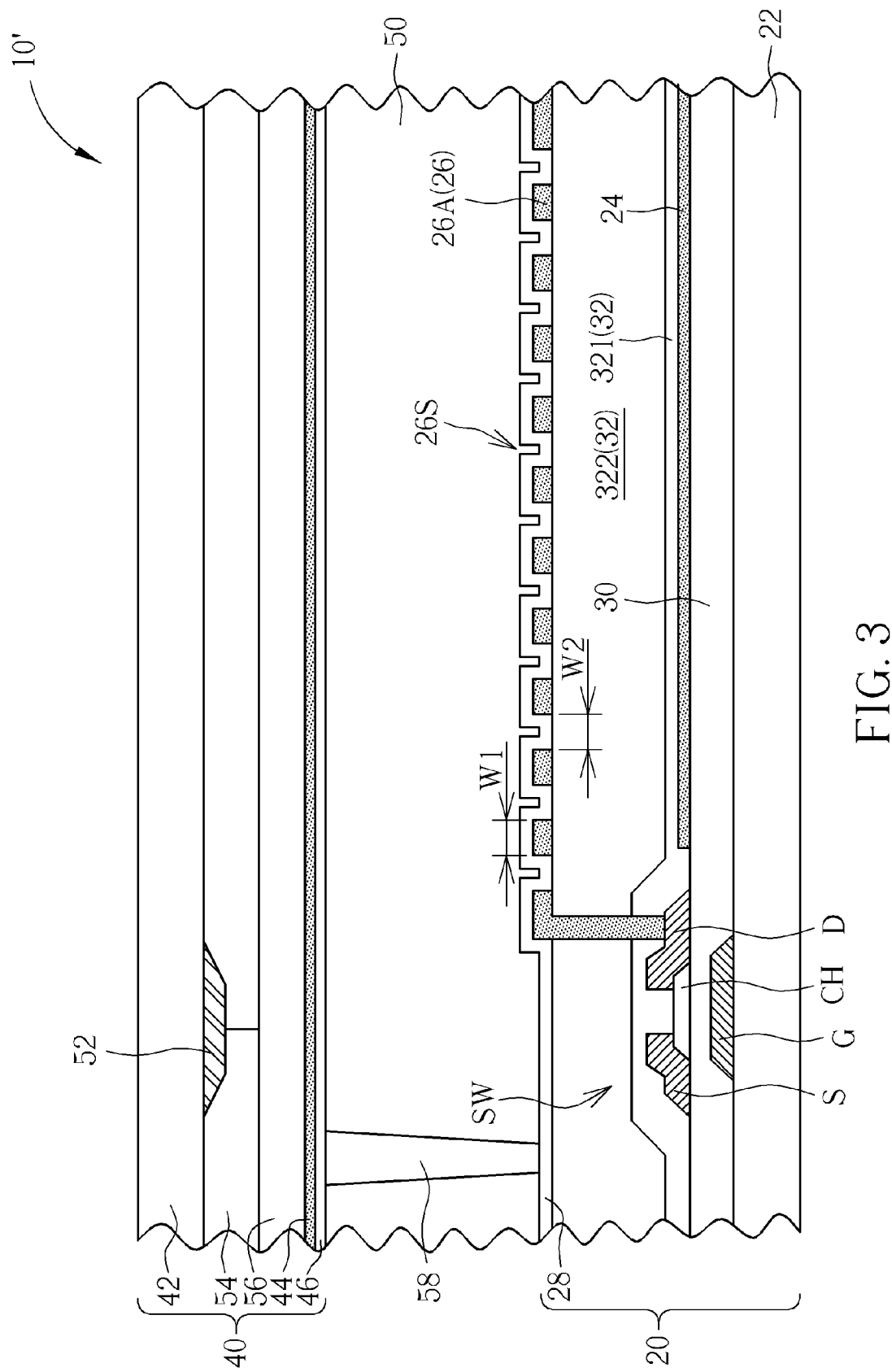
FIG. 3 is a schematic diagram illustrating a display panel according to a second embodiment of the present disclosure.
Figure 4:
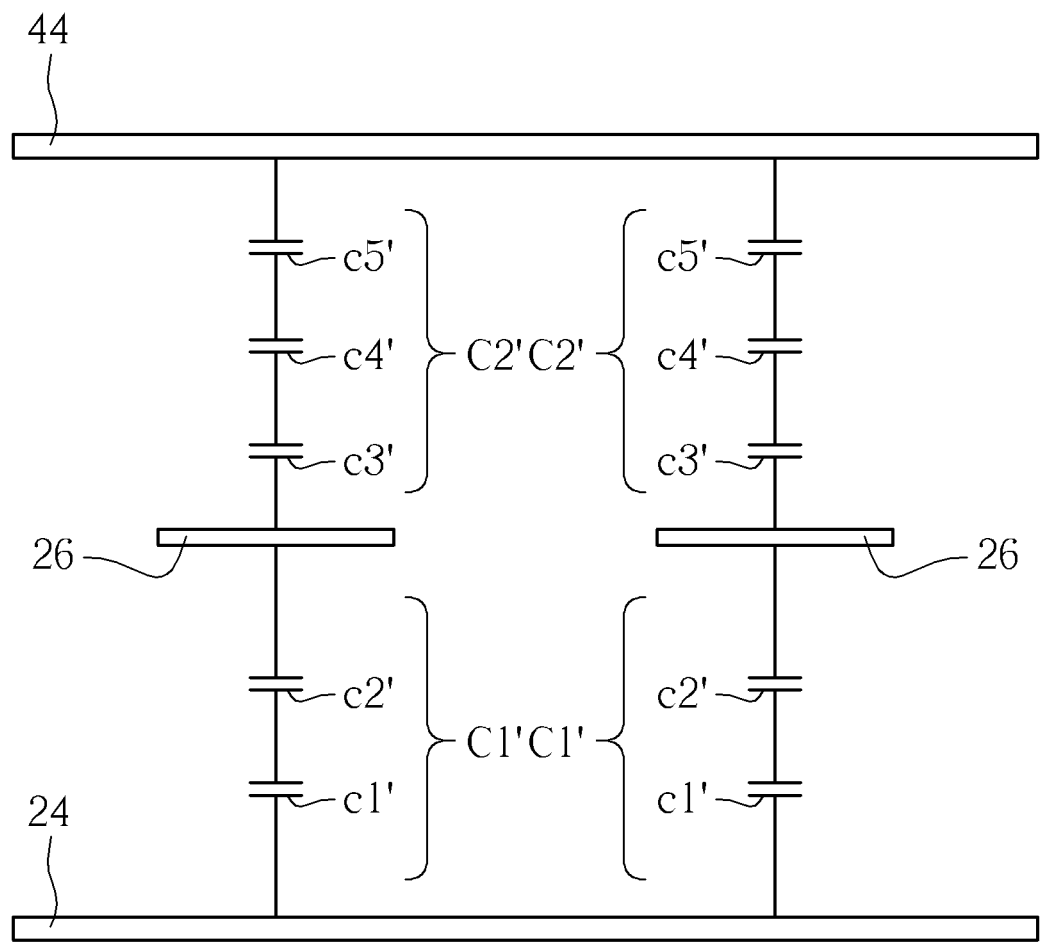
FIG. 4 is an equivalent circuit diagram of the display panel of FIG. 3.

Refer to FIG. 3 and FIG. 4. FIG. 3 is a schematic diagram illustrating a display panel according to a second embodiment of the present disclosure, and FIG. 4 is an equivalent circuit diagram of the display panel of FIG. 3. As shown in FIG. 3, different from the first embodiment, in the display panel 10' of this embodiment, the first common electrode 24 is disposed on the insulation layer 30, rather than underneath the insulation layer 30. As shown in FIG. 4, an equivalent capacitor exists in an insulation layer or a dielectric layer disposed between any two electrodes with a voltage difference by definition. Thus, the first passivation layer 321 has a first sub-capacitor c1', the second passivation layer 322 has a second sub-capacitor c2', the first sub-capacitor c1' and the second sub-capacitor c2' are connected in series between the first common electrode 24 and the pixel electrode 26, and the equivalent capacitance sum of the first sub-capacitor c1' and the second sub-capacitor c2' are substantially equal to the first capacitance C1'. Since the first sub-capacitor c1' and the second sub-capacitor c2' are connected in series, the first capacitance C1' can be calculated by the following formula: C1'=1/(1/c1'+1/c2'). By the same analogy, the first alignment film 28 has a third sub-capacitor c3', the non-self-luminous display medium layer 50 has a fourth sub-capacitor c4', the second alignment film 46 has a fifth sub-capacitor 15', the third sub-capacitor c3', the fourth sub-capacitor c4' and the fifth sub-capacitor c5' are connected in series between the pixel electrode 26 and the second common electrode 44, and the equivalent capacitance sum of the third sub-capacitor c3', the fourth sub-capacitor c4' and the fifth sub-capacitor c5' are substantially equal to the second capacitance C2'. Since the third sub-capacitor c3', the fourth sub-capacitor c4' and the fifth sub-capacitor c5' are connected in series, the second capacitance C2' can be calculated by the following formula: C2'=1/(1/c3'+1/c4'+1/c5'). In this embodiment, the ratio of the second capacitance C2' to the first capacitance C1' (i.e. the second capacitance C2'/the first capacitance C1') is substantially between 0.7 and 1.3; preferably, the ratio of the second capacitance C2' to the first capacitance C1' (i.e. the second capacitance C2'/the first capacitance C1') is substantially greater than 0.9 and less than 1.1; and most preferably, the ratio of the second capacitance C2' to the first capacitance C1' (i.e. the second capacitance C2'/the first capacitance C1') is substantially equal to 1. In the second embodiment, the common line CL is not drawn in FIG. 3, but the arrangement of the common line CL has been detailed in related descriptions of the first embodiment. The second substrate structure 40 of FIG. 3 may further include at least one of the following devices including a light-shielding pattern 52, a color filter layer 54 and an overcoat layer 56 disposed on the second substrate 42, and the arrangement of the above devices has been detailed in related descriptions of the first embodiment and its alternative embodiment.

In this embodiment, the capacitances of the first sub-capacitor c1', the second sub-capacitor c2', the third sub-capacitor c3', the fourth sub-capacitor c4' and the fifth sub-capacitor c5' are basically determined by the dielectric constant and the thickness of the first passivation layer 321, the second passivation layer 322, the first alignment film 28, the non-self-luminous display medium layer 50 and the second alignment film 46. Thus, by modifying the dielectric constant (i.e. the material) and the thickness of the aforementioned layers, the ratio of the second capacitance C2' to the first capacitance C1' (i.e. the second capacitance C2'/the first capacitance C1') may be controlled to be substantially between 0.7 and 1.3; preferably, the ratio of the second capacitance C2' to the first capacitance C1' (i.e. the second capacitance C2'/the first capacitance C1') may be controlled to be substantially greater than 0.9 and less than 1.1; and most preferably, the ratio of the second capacitance C2' to the first capacitance C1' (i.e. the second capacitance C2'/the first capacitance C1') may be controlled to be substantially equal to 1. The dielectric constant (unit free) of the first passivation layer 321 is substantially between 4 and 8 e.g. approximately 5.4, and the thickness of the first passivation layer 321 is substantially between 1000 angstroms and 3000 angstroms e.g. approximately 2000 angstroms. The dielectric constant of the second passivation layer 322 is substantially between 2 and 4 e.g. approximately 3.2, and the thickness of the second passivation layer 322 is substantially between 20,000 angstroms and 40,000 angstroms e.g. approximately 30,000 angstroms. The dielectric constant of the first alignment film 28 is substantially between 2.5 and 4 e.g. approximately 3, and the thickness of the first alignment film 28 is substantially between 500 angstroms and 1500 angstroms e.g. approximately 800 angstroms. The dielectric constant of the non-self-luminous display medium layer 50 is substantially between 3 and 12 e.g. approximately 3.5, and the thickness of the non-self-luminous display medium layer 50 is substantially between 10,000 angstroms and 100,000 angstroms, preferably greater than 20,000 angstroms and less than 45,000 angstroms, and more preferably equal to approximately 32,000 angstroms. The dielectric constant of the second alignment film 46 is substantially between 2.5 and 4 e.g. approximately 3, and the thickness of the second alignment film 46 is substantially between 500 angstroms and 1500 angstroms e.g. approximately 800 angstroms.

Refer to Table 1. Table 1 lists an optimal configuration of the dielectric constant and the thickness of the first passivation layer 321, the second passivation layer 322, the first alignment film 28, the non-self-luminous display medium layer 50 and the second alignment film 46 of the display panel 10' in the second embodiment.

TABLE 1

| | dielectric constant | thickness (Angstrom) | unit capacitance (farad/$\mu m^2$) |
|---|---|---|---|
| first passivation layer | 5.4 | 2000 | $2.391 * 10^{-16}$ |
| second passivation layer | 3.2 | 30000 | $9.444 * 10^{-18}$ |
| first alignment film | 3 | 800 | $3.320 * 10^{-16}$ |
| non-self-luminous display medium layer | 3.5 | 32000 | $9.6840 * 10^{-18}$ |
| second alignment film | 3 | 800 | $3.320 * 10^{-16}$ |

Figure 5:
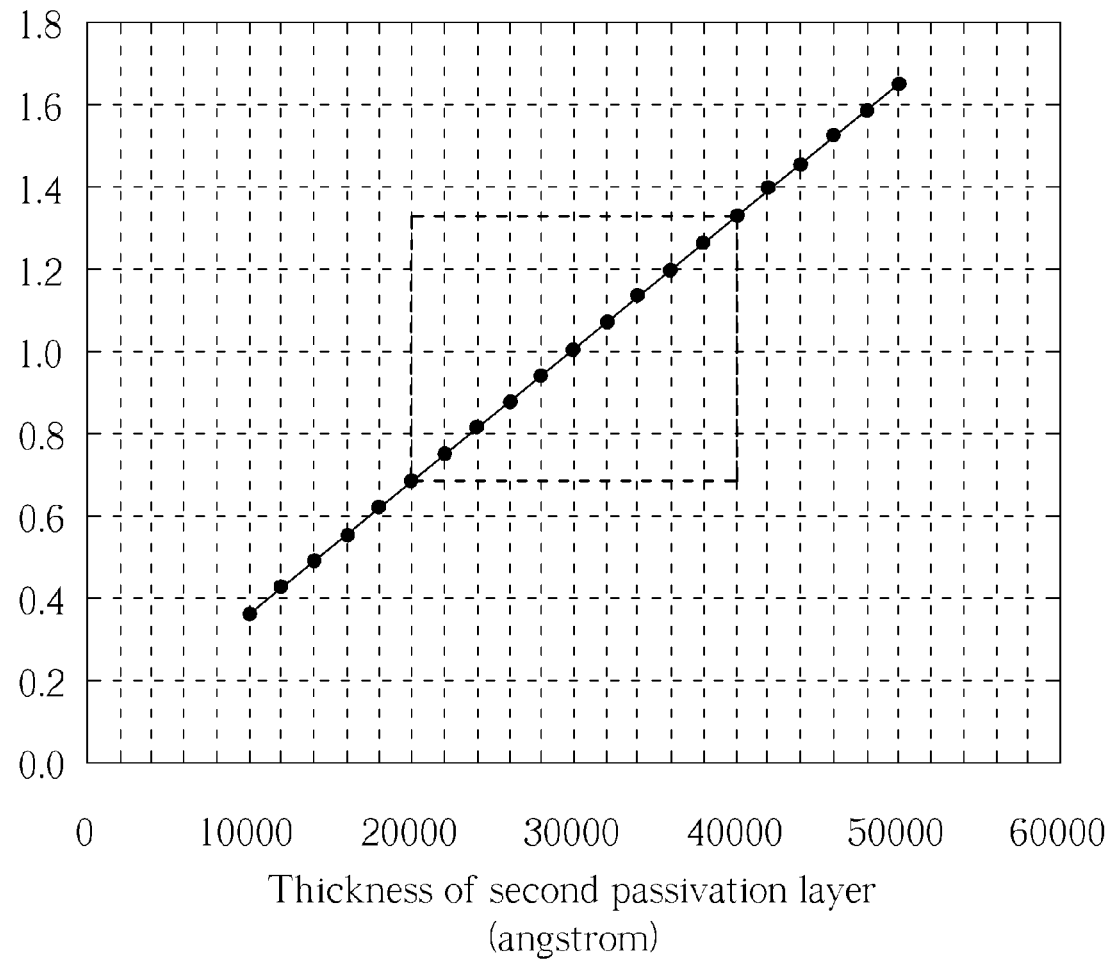
FIG. 5 illustrates a relation between the second capacitance/the first capacitance and the thickness of the second passivation layer.

Refer to FIG. 5, as well as Table 1. FIG. 5 illustrates a relation between the second capacitance/the first capacitance and the thickness of the second passivation layer, where the ratio of the second capacitance to the first capacitance is unit free, and the unit of thickness of the second passivation layer is angstrom. As shown in FIG. 5, when the dielectric constant and the thickness of the first passivation layer, the first alignment film and the non-self-luminous display medium layer and the second alignment film and the dielectric constant of the second passivation layer listed in Table 1 are selected, the ratio of the second capacitance to the first capacitance can be controlled by adjusting the thickness of the second passivation layer. Specifically, when the thickness of the second passivation layer is substantially between 20,000 angstroms and 40,000 angstroms, the ratio of the second capacitance to the first capacitance is substantially between 0.7 and 1.3; more preferably, when the thickness of the second passivation layer is approximately greater than 26,000 angstroms and less than 33,000 angstroms, the ratio of the second capacitance to the first capacitance is substantially between 0.9 and 1.1; and most preferably, when the thickness of the second passivation layer is approximately 30,000 angstroms, the ratio of the second capacitance to the first capacitance is substantially equal to 1. By the same analogy, the display panel of the first embodiment can have symmetrical capacitor design. In the aforementioned embodiment, the second capacitance is modified by altering the thickness or the dielectric constant of the second passivation layer, but not limited thereto. The ratio of the second capacitance to the first capacitance can be controlled by altering the thickness or the dielectric constant of any dielectric layer disposed between the first common electrode and the pixel electrode and/or the thickness or the dielectric constant of any dielectric layer disposed between the second common electrode and the pixel electrode.

Figure 6:
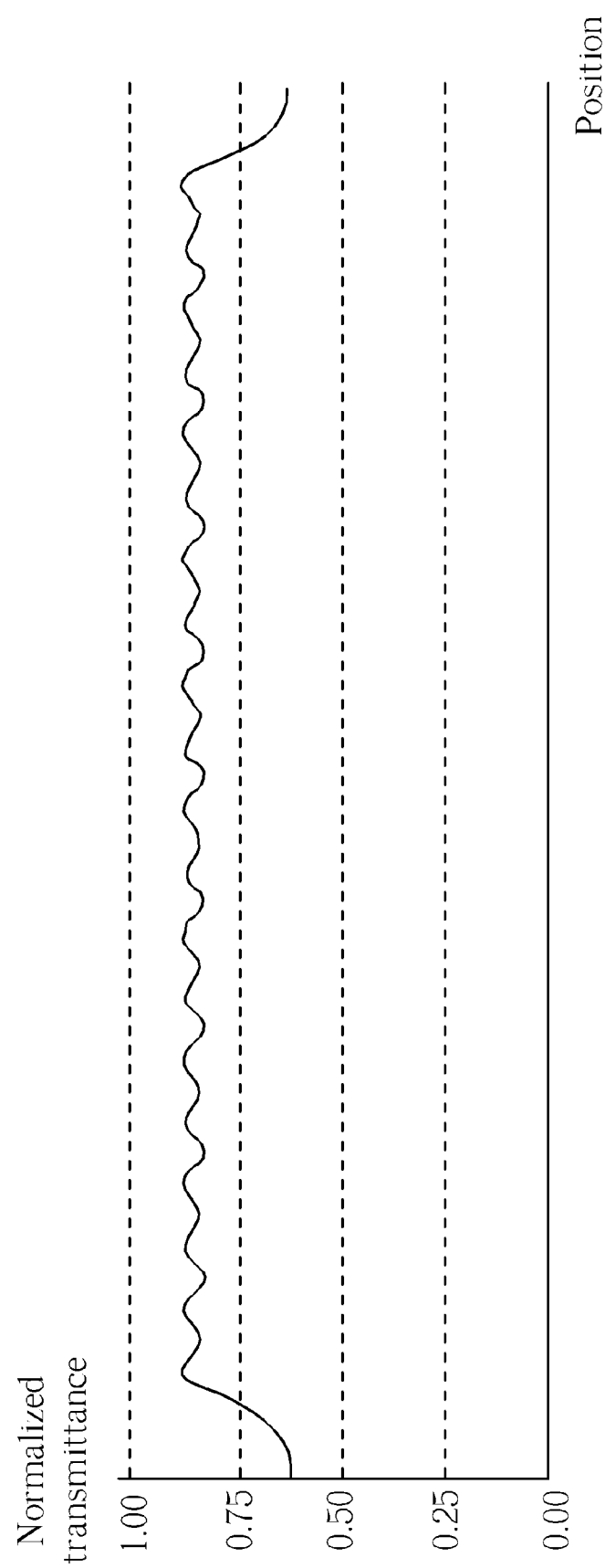
FIG. 6 is a simulation diagram of a normalized transmittance of a single sub-pixel of a display panel according to an embodiment of the present disclosure.
Figure 7:
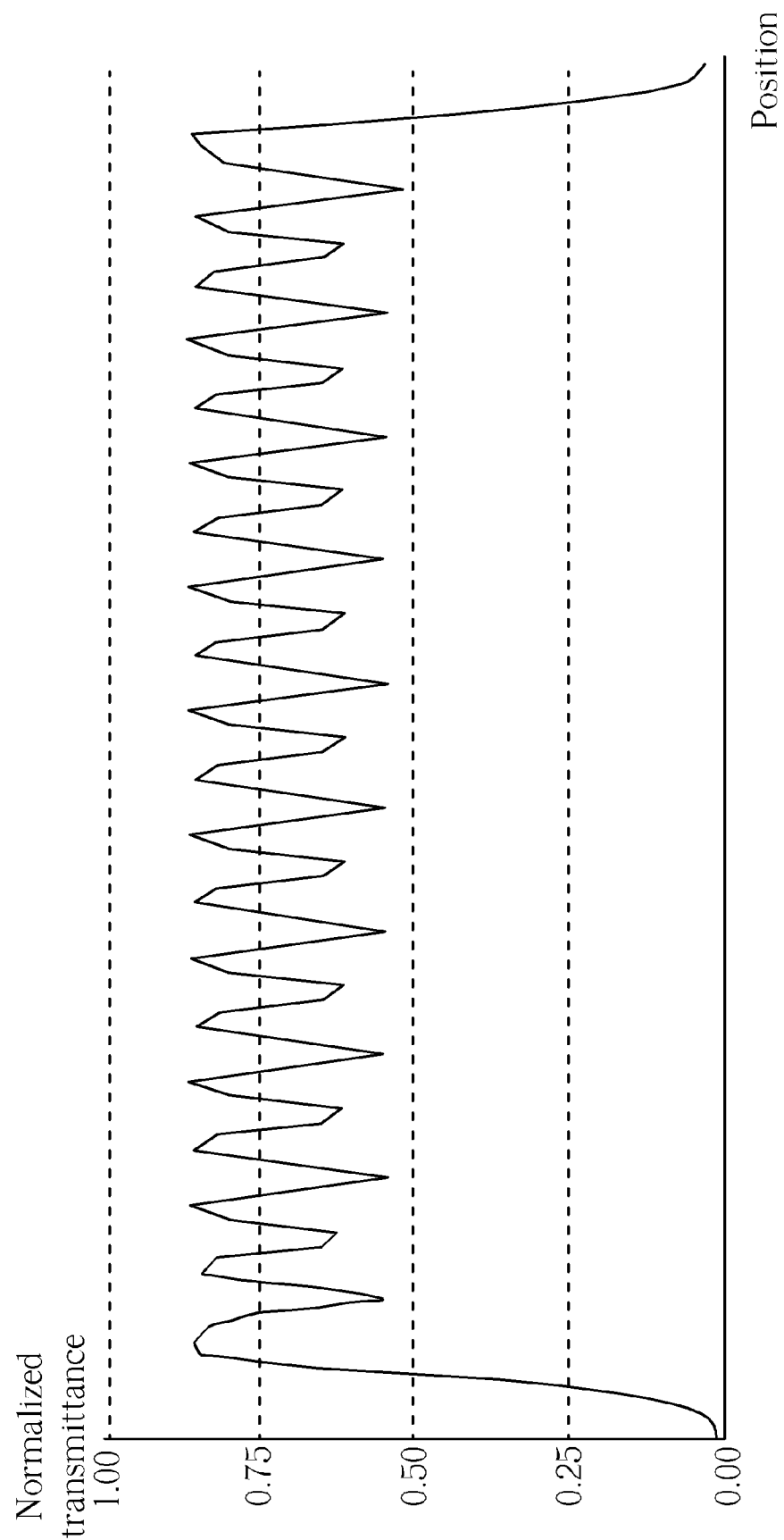
FIG. 7 is a simulation diagram of a normalized transmittance of a single sub-pixel of a display panel according to a control embodiment.

Refer to FIG. 6 and FIG. 7. FIG. 6 is a simulation diagram of a normalized transmittance of a single sub-pixel of a display panel according to an embodiment of the present disclosure, and FIG. 7 is a simulation diagram of a normalized transmittance of a single sub-pixel of a display panel according to a control embodiment. The normalized transmittance is unit free, and the light within visible wavelength range is measured but the wavelength of the light is not limited to single wavelength. The position is the dimension of the sub-pixel, measured form 0 micrometer to 300 micrometers, and the unit of the position is micrometer. Compared to the display panel of FIG. 1 or FIG. 3 of the present disclosure, in the display panel of the control embodiment of FIG. 7, the second passivation layer 322 is omitted, or the second passivation layer 322 is an inorganic passivation layer, or the second passivation layer 322 is an insulation layer where the dielectric constant is greater than the dielectric constant of silicon oxide, where the dielectric constant of silicon oxide is about 4. As shown in FIG. 6, at different positions, the normalized transmittance of the display panel of the present embodiment is significantly more uniform, and an average of the normalized transmittance is approximately 82.5%. As shown in FIG. 7, at different positions, the normalized transmittance of the display panel of the control embodiment is significantly more non-uniform, and an average of the normalized transmittance is approximately 75%. Evidently, the brightness of the image provided by the display panel of the present embodiment is higher with more uniform distribution. The display panel of the control embodiment may have different variant configurations. For example, in a first variant configuration of the control embodiment, the pixel electrode 26 and the first common electrode 24 of the display panel of FIG. 1 or FIG. 3 are interchanged, i.e. the pixel electrode 26 is disposed underneath the first common electrode 24. In such a case, the first common electrode 24 and the second common electrode 44 are close to the non-self-luminous display medium layer 50, while the pixel electrode 26 is away from the non-self-luminous display medium layer 50. Since the first common electrode 24 and the second common electrode 44 are both provided with a common voltage, there is no voltage difference between the first common electrode 24 and the second common electrode 44. There is no equivalent capacitor existing in an insulation layer or a dielectric layer disposed between any two electrodes with no voltage difference by definition. Consequently, the equivalent capacitance sum of the first alignment film 28, the non-self-luminous display medium layer 50 and the second alignment film 46 disposed between the first common electrode 24 and the second common electrode 44 is approximately 0, i.e. the second capacitance C2 or C2' is about 0. The pixel electrode 26 is disposed underneath the first common electrode 24, the pixel electrode 26 and the first common electrode 24 are provided with different voltages, and the insulation layer 30 and the passivation layer 32 are interposed between the first common electrode 24 and the pixel electrode 26. Thus, the equivalent capacitance sum of the insulation layer 30 and the passivation layer 32 is the first capacitance C1 or C1'. However, the ratio of the second capacitance to the first capacitance is equal to 0/C1 or 0/C1', which is still 0. In other words, the electric field distribution and the capacitor arrangement of the display panel of the control embodiment are different from that of the present embodiment, and the display panel of the control embodiment is not able to provide the same effect as the display panel of the present embodiment is able to. In a second variant configuration of the control embodiment, the pixel electrode 26 and the first common electrode 24 of the display panel of FIG. 1 or FIG. 3 are disposed at the same horizontal level and are disposed alternately. The first common electrode 24 and the second common electrode 26 are both provided with a common voltage, and thus there is no voltage difference between the first common electrode 24 and the second common electrode 44. The pixel electrode 26 and the first common electrode 24 are provided with different voltages. In such a case, the equivalent capacitance sum of the first alignment film 28, the non-self-luminous display medium layer 50 and the second alignment film 46 disposed between the first common electrode 24 and the second common electrode 44 is approximately 0; and the equivalent capacitance sum of the first alignment film 28, the non-self-luminous display medium layer 50 and the second alignment film 46 disposed between the pixel electrode 26 and the first common electrode 24 is approximately C2 or C2'. However, since no insulation layer or dielectric layer exists between the pixel electrode 26 and the first common electrode 24, there is not capacitor or only a parasitic capacitor or a stray capacitor with negligible capacitance exists between the pixel electrode 26 and the first common electrode 24. The equivalent capacitance sum between the pixel electrode 26 and the first common electrode 24 is approximately 0, i.e. the first capacitance C1 or C1' is about 0. Consequently, the ratio of the second capacitance to the first capacitance is equal to C2/0, which is infinite ($\infty$). Therefore, the electric field distribution and the capacitor arrangement of the display panel of the control embodiment are different from that of the present embodiment, and the display panel of the control embodiment is not able to provide the same effect as the display panel of the present embodiment is able to.

The first common electrode, the pixel electrode and the second common electrode of the display panel of the aforementioned embodiments overlap in the vertical projection direction. When displaying, the voltage difference between the first common voltage of the first common electrode and the pixel voltage of the pixel electrode forms a first capacitance in the dielectric layers therebetween, and the voltage difference between the second common voltage of the second common electrode and the pixel voltage of the pixel electrode forms a second capacitance in the dielectric layers therebetween. The ratio of the second capacitance to the first capacitance (i.e. the second capacitance divided by the first capacitance) is substantially between 0.7 and 1.3; preferably, the ratio of the second capacitance to the first capacitance is substantially greater than 0.9 and less than 1.1; and most preferably, the ratio of the second capacitance to the first capacitance is substantially equal to 1. Accordingly, the transmittance and the uniformity of the transmittance distribution are improved, which thus can avoid image retention. In addition, the ratio of the second capacitance to the first capacitance can be controlled by altering the thickness or the dielectric constant of any dielectric layer disposed between the first common electrode and the pixel electrode and/or the thickness or the dielectric constant of any dielectric layer disposed between the second common electrode and the pixel electrode.

Figure 8:
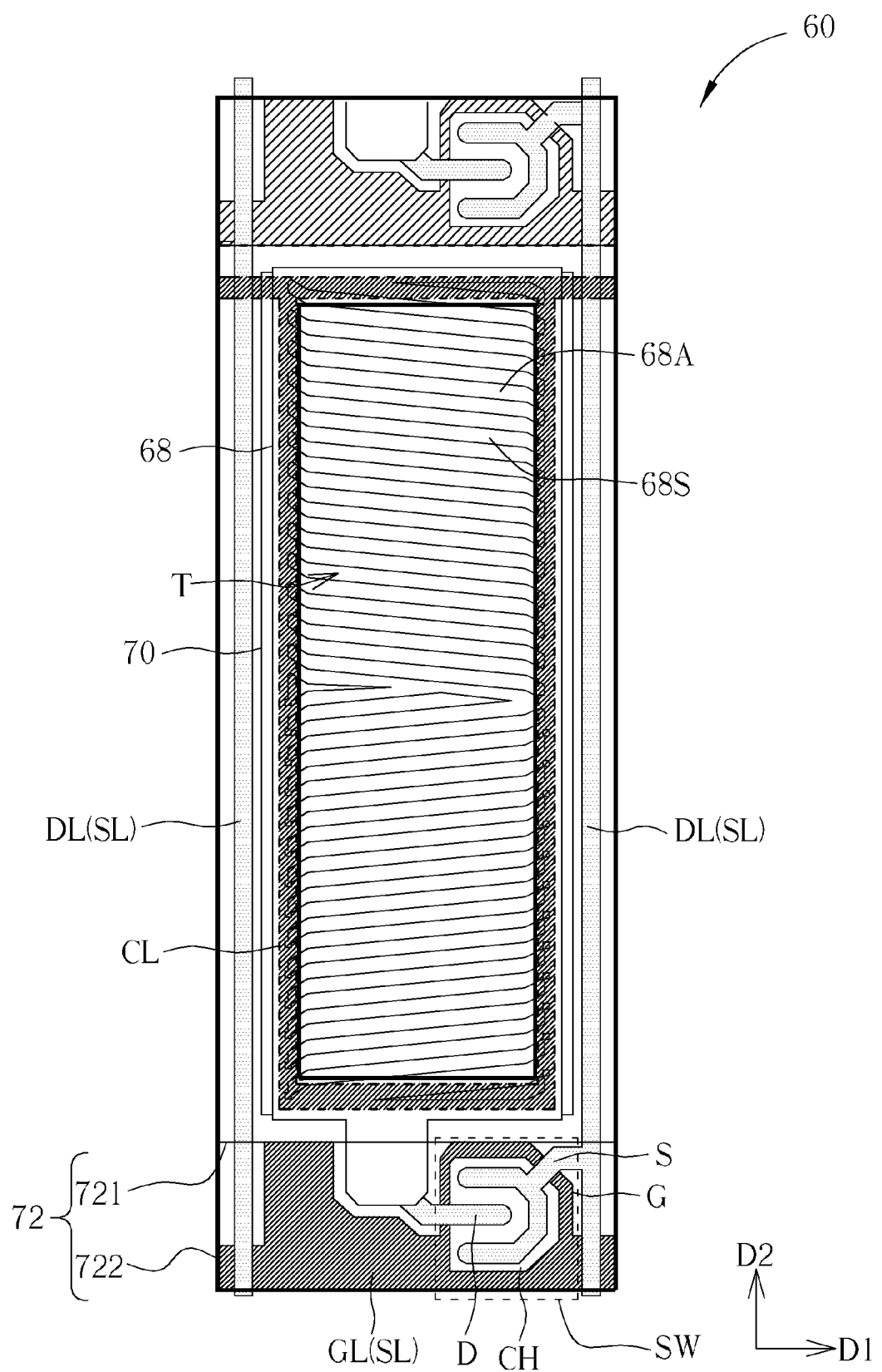
FIG. 8 is a top view of a display panel according to a third embodiment of the present disclosure.
Figure 9:
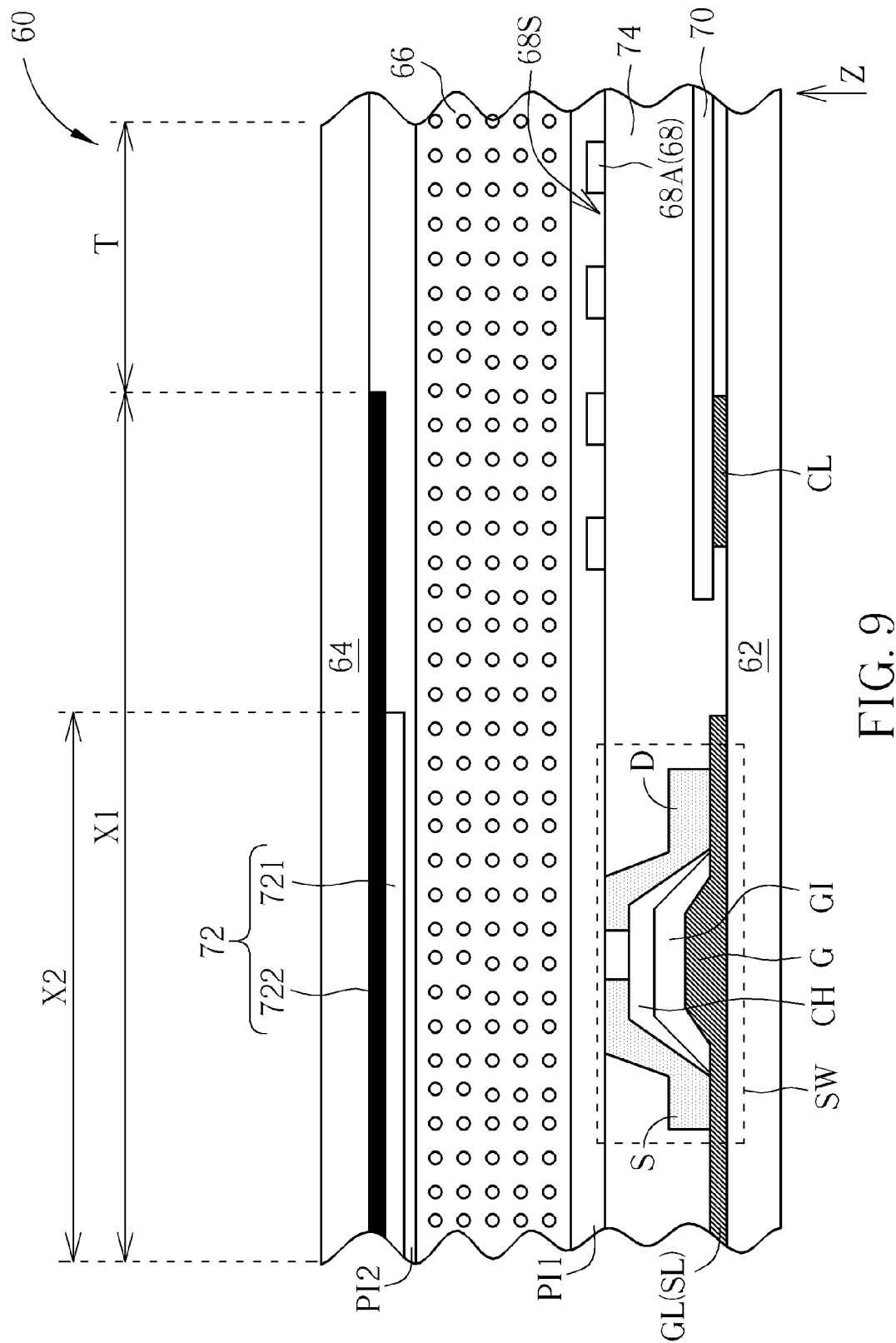
FIG. 9 is a cross-sectional view of a display panel according to a third embodiment of the present disclosure.

Refer to FIG. 8 and FIG. 9. FIG. 8 is a top view of a display panel according to a third embodiment of the present disclosure, and FIG. 9 is a cross-sectional view of a display panel according to a third embodiment of the present disclosure. The display panel of this embodiment includes a plurality of pixels, and each pixel includes a plurality of sub-pixels. To highlight the features of the display panel of the present disclosure, only one single sub-pixel is exemplarily drawn in FIG. 8 and FIG. 9. As shown in FIG. 8 and FIG. 9, the display panel 60 of this embodiment includes a first substrate 62, a second substrate 64, a non-self-luminous display medium layer 66, a signal line SL, an active switching device SW, a pixel electrode 68, a common line CL, a common electrode 70 and a light-blocking stacking layer 72. The first substrate 62 and the second substrate 64 are disposed opposite to each other, and the second substrate 64 is disposed on the first substrate 62. The first substrate 62 and the second substrate 64 may include transparent substrates, which may individually be a rigid substrate or a flexible substrate such as a glass substrate, a quartz substrate or a plastic substrate, but not limited thereto. The non-self-luminous display medium layer 66 may include a liquid crystal layer, but not limited thereto. The non-self-luminous display medium layer 66 may also be other types of non-self-luminous display medium layer such as an electrophoretic layer or an electrowetting layer. The signal line SL is disposed on the first substrate 62. The active switching device SW is disposed on the first substrate 62 and electrically connected to the signal line SL. The pixel electrode 68 is disposed on the first substrate 62 and electrically connected to the active switching device SW. The common line CL is disposed on the first substrate 62. The common electrode 70 is disposed on the first substrate 62 and electrically connected to the common line CL. The pixel electrode 68 and the common electrode 70 together define a light-transmitting region (or namely light-permitting region) T, which can provide display function with a light source. The common electrode 70 and the pixel electrode 68 are spaced and separated from each other, i.e. the common electrode 70 and the pixel electrode 68 are electrically insulated, wherein "electrically insulated" means that voltage of the pixel electrode 68 is not transmitted to the common electrode 70 via any conductive wires and voltage of the common electrode 70 is not transmitted to the pixel electrode 68 via any conductive wires. An alignment film PI1 may be optionally disposed on the first substrate 62. The light-blocking stacking layer 72 is disposed on the second substrate 64. The light-blocking stacking layer 72 includes a transparent electrode layer 721 and a light-shielding layer 722 (also referred to as a light-absorbing layer, an opaque layer or black matrix). The transparent electrode layer 721 may be a single-layered or a multi-layered structure, and the material of the transparent electrode layer 721 may include, for example, indium tin oxide (ITO), indium zinc oxide (IZO), aluminum indium oxide (AIO), aluminum zinc oxide (AZO), aluminum tin oxide (ATO), metal having a thickness less than 60 nanometers, alloy having a thickness less than 60 nanometers, carbon nanotube (CNT), nano silver particle or other transparent conductive materials. The light-shielding layer 722 may be a single-layered or a multi-layered structure, and the material of the light-shielding layer 722 may include opaque material or light-absorbing material. The material of the light-shielding layer 722 may be an insulating material e.g. black resin, a plurality of color resin materials or color ink material stacking to each other, or a conductive material e.g. metal or alloy. The pixel electrode 68 may be a single-layered or a multi-layered structure, and the material of the pixel electrode 68 may be the same as that of the transparent electrode layer 721, but not limited thereto. In addition, an alignment film PI2 may be optionally disposed on the second substrate 64, which covers the second substrate 64 and the light-blocking stacking layer 72.

In this embodiment, the signal line SL may at least include a gate line GL and a data line DL. The gate line GL and the data line DL are substantially arranged along a first direction D1 and a second direction D2, respectively, where the first direction D1 intersects the second direction D2. The first direction D1 and the second direction D2 may be substantially perpendicular to each other, but not limited thereto. The active switching device SW may be a bottom gate TFT device, which includes a gate electrode G, a gate insulation layer GI, a semiconductor channel CH, a source electrode S and a drain electrode D. The gate electrode G is disposed on the first substrate 62 and electrically connected to the gate line GL. The gate electrode G, the gate line GL and the common line CL may be made of the same patterned conductive layer e.g. a patterned metal layer. The gate insulation layer GI covers the gate electrode G. The semiconductor channel CH is disposed on the gate insulation layer GI and corresponding to the gate electrode G. The material of the semiconductor channel CH may include various types of semiconductor materials. For example, the semiconductor channel CH may be a single-layered or a multi-layered structure, and the material may include amorphous silicon, polycrystalline silicon, single crystalline silicon, microcrystalline silicon, nanocrystalline silicon, oxide semiconductor material (e.g. IGZO, IGO, IZO, ITO, TiO, ZnO, InO, GaO), organic semiconductor material or other suitable semiconductor materials. The source electrode S and the drain electrode D are disposed on two opposite sides of the semiconductor channel CH and partially overlap the semiconductor channel CH respectively. The source electrode S is electrically connected to the data line DL, and the drain electrode D is electrically connected to the pixel electrode 68. The source electrode S, the drain electrode D and the data line DL may be made of the same patterned conductive layer e.g. a patterned metal layer, but not limited thereto. In an alternative embodiment, the active switching device SW may be a top gate TFT device, in which the semiconductor channel CH is disposed underneath the gate electrode G and the gate insulation layer GI, and the gate insulation layer GI is disposed between the semiconductor channel CH and the gate electrode G. In still another alternative embodiment, the active switching device SW may be other suitable active switching devices. In this embodiment, an FFS display panel is selected as an example of the display panel 60, but not limited. The common electrode 70 and the pixel electrode 68 are disposed at different horizontal levels and insulated with an insulation layer 74 in the vertical projection direction Z. In addition, at least one of the pixel electrode 68 and the common electrode 70 has a plurality of slits. For example, the pixel electrode 68 may be a patterned electrode, which includes a plurality of branch electrodes 68A electrically connected to each other, and a slit 68S disposed between two adjacent branch electrodes (or namely two neighbor branch electrodes) 68A. The branch electrodes 68A extend approximately along the first direction D1, and may be parallel or non-parallel to each other. The common electrode 70 may be a full surface electrode (or namely plane electrode), and the pixel electrode 68 is disposed on the common electrode 70. In a first alternative embodiment, the pixel electrode 68 may be a full surface electrode (or namely plane electrode), while the common electrode 70 may be a patterned electrode including a plurality of branch electrodes and slits, where the pixel electrode 68 is disposed underneath the common electrode 70. In a second alternative embodiment, the common electrode 70 and the pixel electrode 68 are both patterned electrodes. The common electrode 70 and the pixel electrode 68 are disposed at different horizontal levels and insulated with an insulation layer 74 in the vertical projection direction Z, and the common electrode 70 and the pixel electrode 68 are arranged alternately, where the pixel electrode 68 may be disposed on the common electrode 70. In a third alternative embodiment, the display panel 60 may be an IPS display panel. The common electrode 70 and the pixel electrode 68 are disposed at the same horizontal level and insulated in the horizontal direction, and the common electrode 70 and the pixel electrode 68 both may be patterned electrodes.

In this embodiment, the common line CL has a closed hollow frame shape, which surrounds the light-transmitting region T. The common line CL may have any other suitable shapes. The light-blocking stacking layer 72 overlaps the active switching device SW, the signal line SL and the common line CL in the vertical projection direction Z but exposes the light-transmitting region (or namely light-permitting region) T in the vertical projection direction Z. The exposed light-transmitting region T is an effective light-transmitting region (or namely effective light-permitting region). That is, there is no light-blocking stacking layer 72 existing in the effective light-transmitting region in the vertical projection direction Z. In addition, the width X1 of the light-shielding layer y722 is greater than the width X2 of the transparent electrode layer 721. For example, the light-shielding layer 722 of the light-blocking stacking layer 72 overlaps the active switching device SW, the gate line GL and/or the data line DL and the common line CL in the vertical projection direction Z, while the transparent electrode layer 721 of the light-blocking stacking layer 72 overlaps the active switching device SW and the gate line GL, optionally overlaps the data line DL, but does not overlap the common line CL in the vertical projection direction Z. Furthermore, the transparent electrode layer 721 is aligned to the side of the gate electrode G or the side of the gate line GL adjacent to the light-transmitting region T. The light-shielding layer 722 is opaque, which can shield the light leakage between the common line CL and the gate line GL and the light leakage between the common line CL and the data line DL in the front view direction. The voltage difference between the transparent electrode layer 721 and the gate electrode G of the active switching device SW forms a vertical electric field, which can drives the liquid crystal molecules disposed between the transparent electrode layer 721 and the gate electrode G to incline. Therefore, the light leakage between the common line CL and the gate line GL in the side view direction is shielded.

Figure 10A:
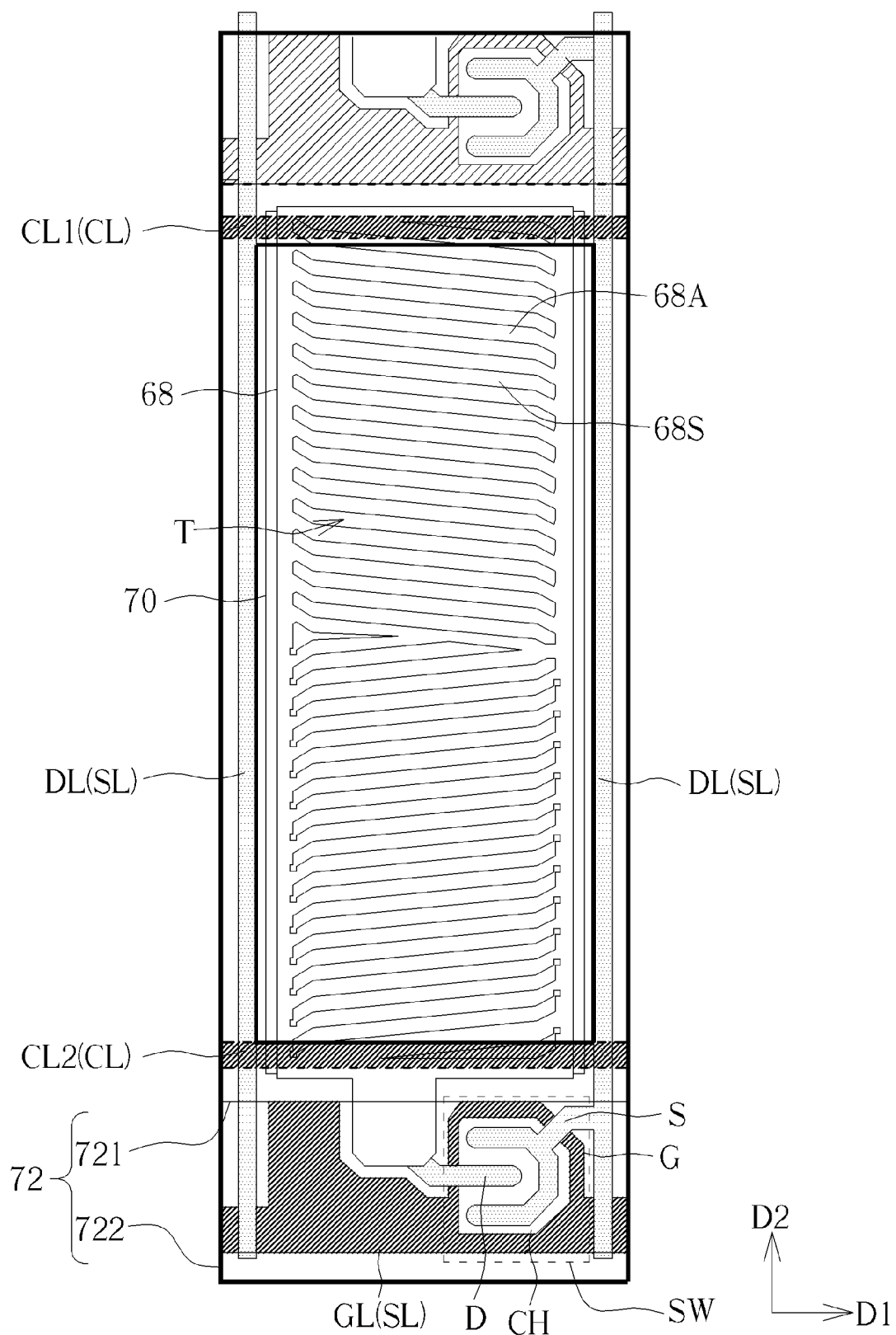
FIG. 10A depicts a common line of the display panel according to a first alternative embodiment of the present disclosure.

Refer to FIGS. 10A-10E as well as FIG. 8 and FIG. 9. FIGS. 10A-10E depict several types of common lines according to different alternative embodiments of the present disclosure. To highlight the shape of the common line, the pixel electrode and the common electrode are omitted in FIGS. 10A-10E. FIG. 10A depicts a common line of the display panel according to a first alternative embodiment of the present disclosure. As shown in FIG. 10A, the common line CL includes a first common segment CL1 and a second common segment CL2 disconnected from each other, where the first common segment CL1 and the second common segment CL2 both are I-shaped common line (also referred to bar-shaped common line) substantially disposed along the first direction D1. The first common segment CL1 is disposed on one side of the light-transmitting region T and adjacent to the gate line GL and the active switching device SW of the same sub-pixel, while the second common segment CL2 is disposed on the other side of the light-transmitting region T and adjacent to the gate line GL and the active switching device SW of another sub-pixel. In other words, the light-blocking stacking layer 72 overlaps the active switching device SW, the signal line SL (e.g. the gate line GL) and the common line CL in the vertical projection direction Z, optionally overlaps the data line DL, but exposes the light-transmitting region T. In other embodiments, the first common segment CL1 and the second common segment CL2 may be "I" shape common line (also referred to bar-shaped common line) substantially disposed along the second direction D2.

Figure 10B:
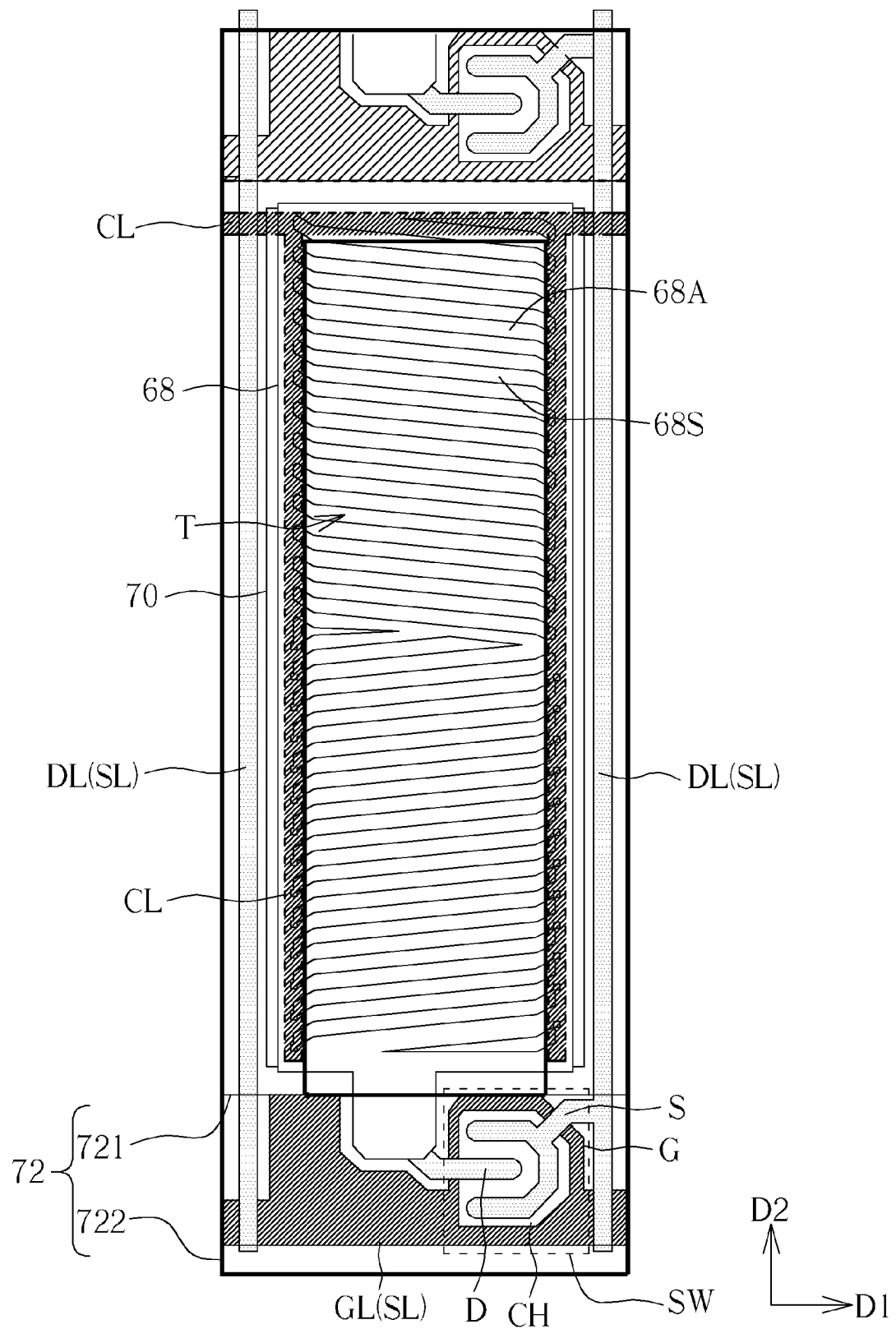
FIG. 10B depicts a common line of the display panel according to a second alternative embodiment of the present disclosure.

FIG. 10B depicts a common line of the display panel according to a second alternative embodiment of the present disclosure. As shown in FIG. 10B, The common line CL is substantially inversed U-shaped, disposed on three sides of the light-transmitting region T. Alternatively, the common line CL may also be U-shaped. In other words, the light-blocking stacking layer 72 overlaps the active switching device SW, the signal line SL (e.g. the gate line GL and/or the data line DL) and the common line CL in the vertical projection direction Z, but exposes the light-transmitting region T. The exposed light-transmitting region T is an effective light-transmitting region. That is, there is no light-blocking stacking layer 72 existing in the effective light-transmitting region in the vertical projection direction Z.

Figure 10C:
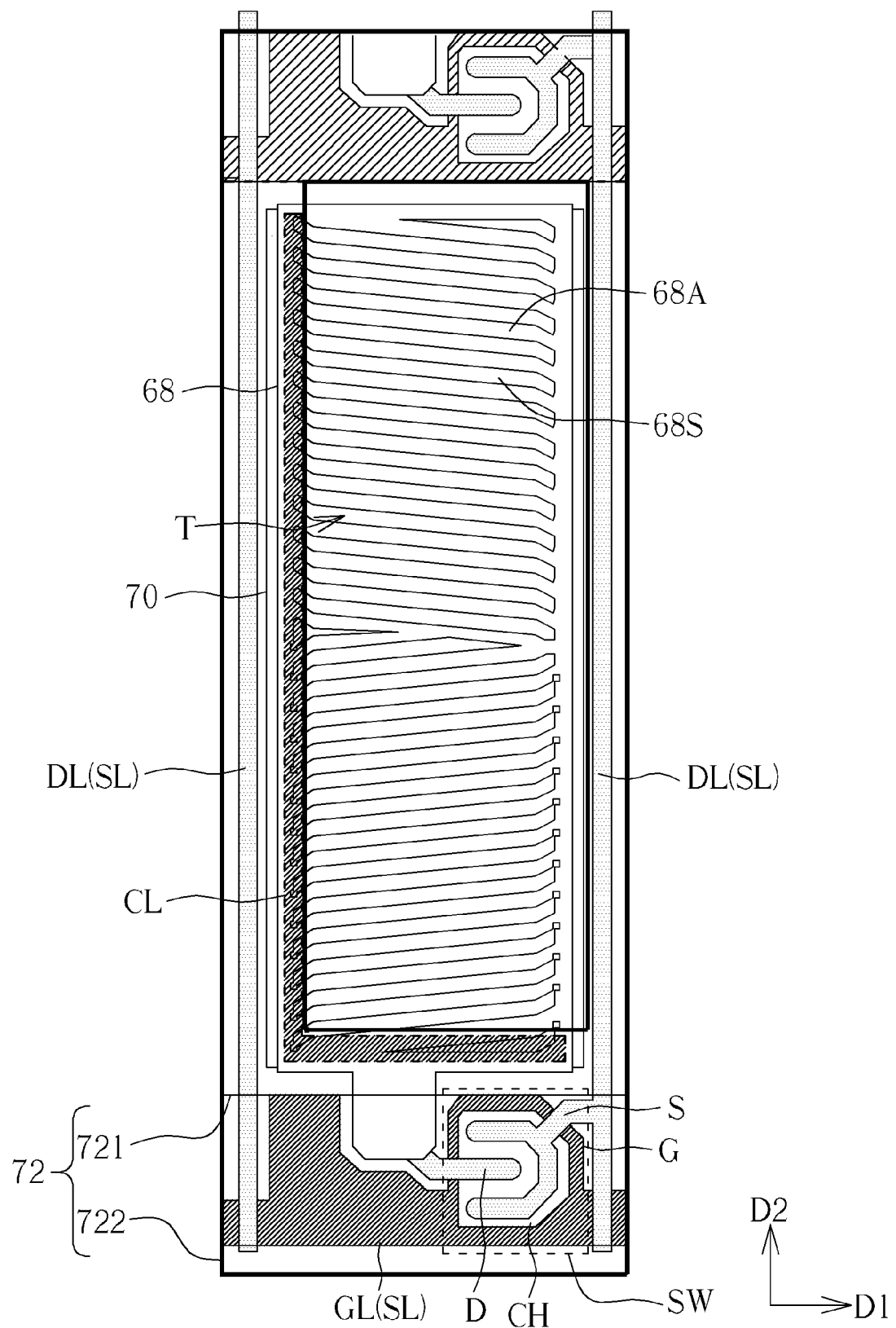
FIG. 10C depicts a common line of the display panel according to a third alternative embodiment of the present disclosure.

FIG. 10C depicts a common line of the display panel according to a third alternative embodiment of the present disclosure. As shown in FIG. 10C, the common line CL is substantially H-shaped. In other words, the light-blocking stacking layer 72 overlaps the active switching device SW, the signal line SL (e.g. the gate line GL and/or the data line DL) and the common line CL in the vertical projection direction Z, but exposes the light-transmitting region T. The exposed light-transmitting region T is an effective light-transmitting region. That is, there is no light-blocking stacking layer 72 existing in the effective light-transmitting region in the vertical projection direction Z.

Figure 10D:
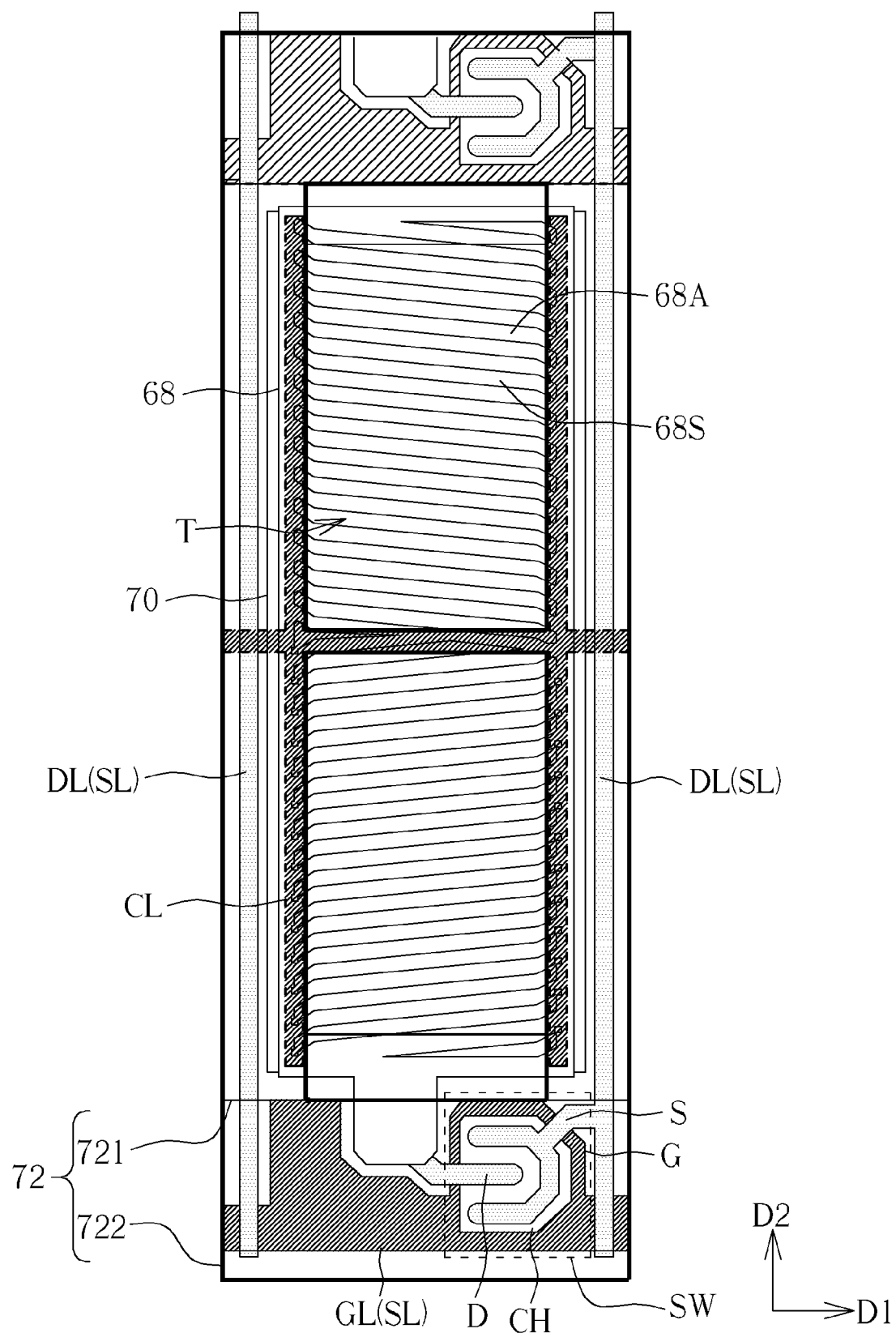
FIG. 10D depicts a common line of the display panel according to a fourth alternative embodiment of the present disclosure.

FIG. 10D depicts a common line of the display panel according to a fourth alternative embodiment of the present disclosure. As shown in FIG. 10D, the common line CL includes a first common segment CL1 and a second common segment CL2 connected to each other, where the first common segment CL1 has a closed hollow frame shape, which surrounds the light-transmitting region T, while the second common segment CL2 is I-shaped substantially disposed along the first direction D1 and connected to the first common segment CL1 at both ends. In other words, the light-blocking stacking layer 72 overlaps the active switching device SW, the signal line SL (e.g. the gate line GL and/or the data line DL) and the common line CL in the vertical projection direction Z, but exposes the light-transmitting region T. The exposed light-transmitting region T is an effective light-transmitting region. That is, there is no light-blocking stacking layer 72 existing in the effective light-transmitting region in the vertical projection direction Z.

Figure 10E:
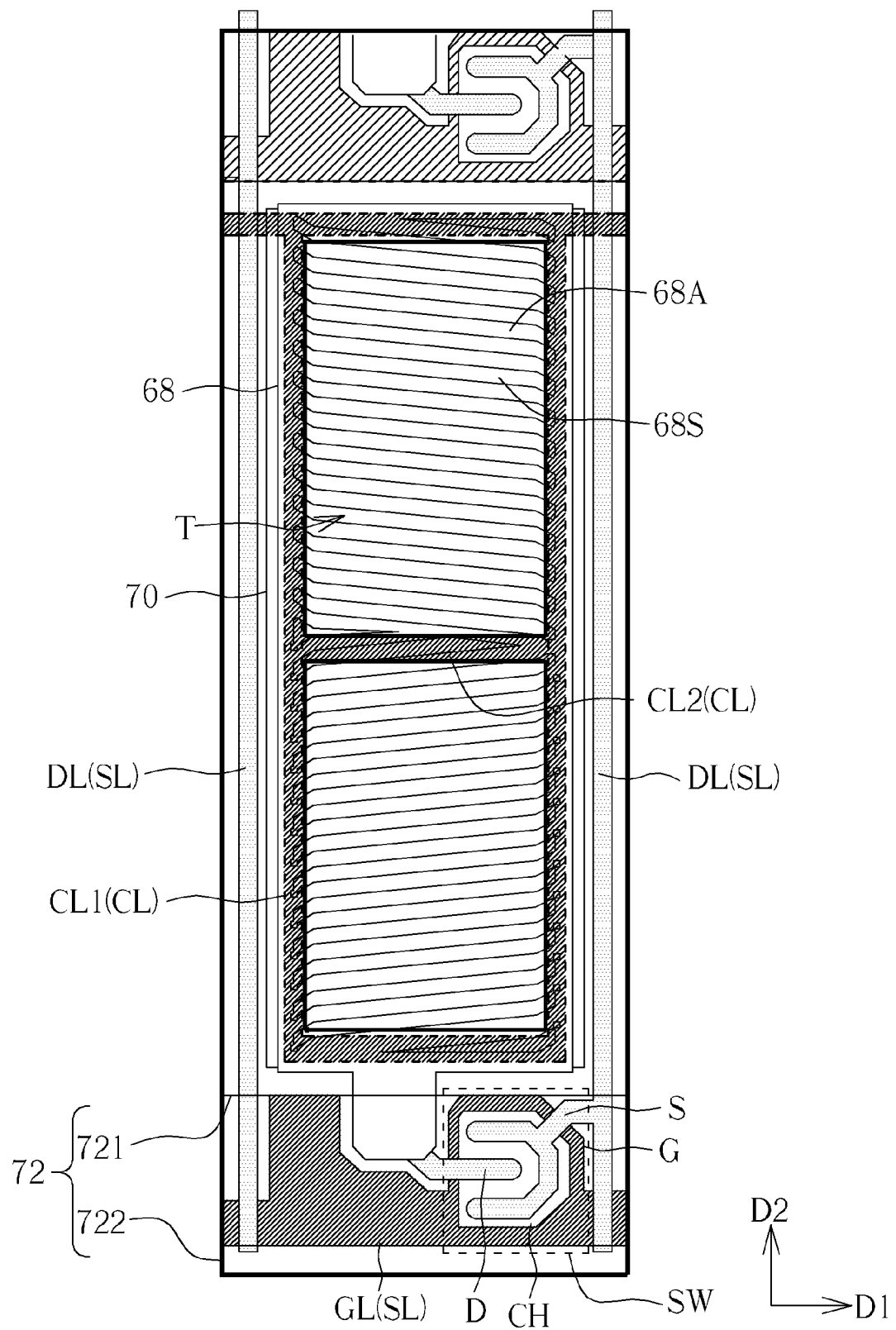
FIG. 10E depicts a common line of the display panel according to a fifth alternative embodiment of the present disclosure.

FIG. 10E depicts a common line of the display panel according to a fifth alternative embodiment of the present disclosure. As shown in FIG. 10E, the common line CL is θ-shaped, which includes a first common segment CL1 and a second common segment CL2 connected to each other. The first common segment CL1 has a closed hollow frame shape, which surrounds the light-transmitting region T, while the second common segment CL2 is I-shaped substantially disposed along the first direction D1 and connected to the first common segment CL1 at both ends. In other words, the light-blocking stacking layer 72 overlaps the active switching device SW, the signal line SL (e.g. the gate line GL and/or the data line DL) and the common line CL in the vertical projection direction Z, but exposes the light-transmitting region T. The exposed light-transmitting region T is an effective light-transmitting region. That is, there is no light-blocking stacking layer 72 existing in the effective light-transmitting region in the vertical projection direction Z.

Figure 11:
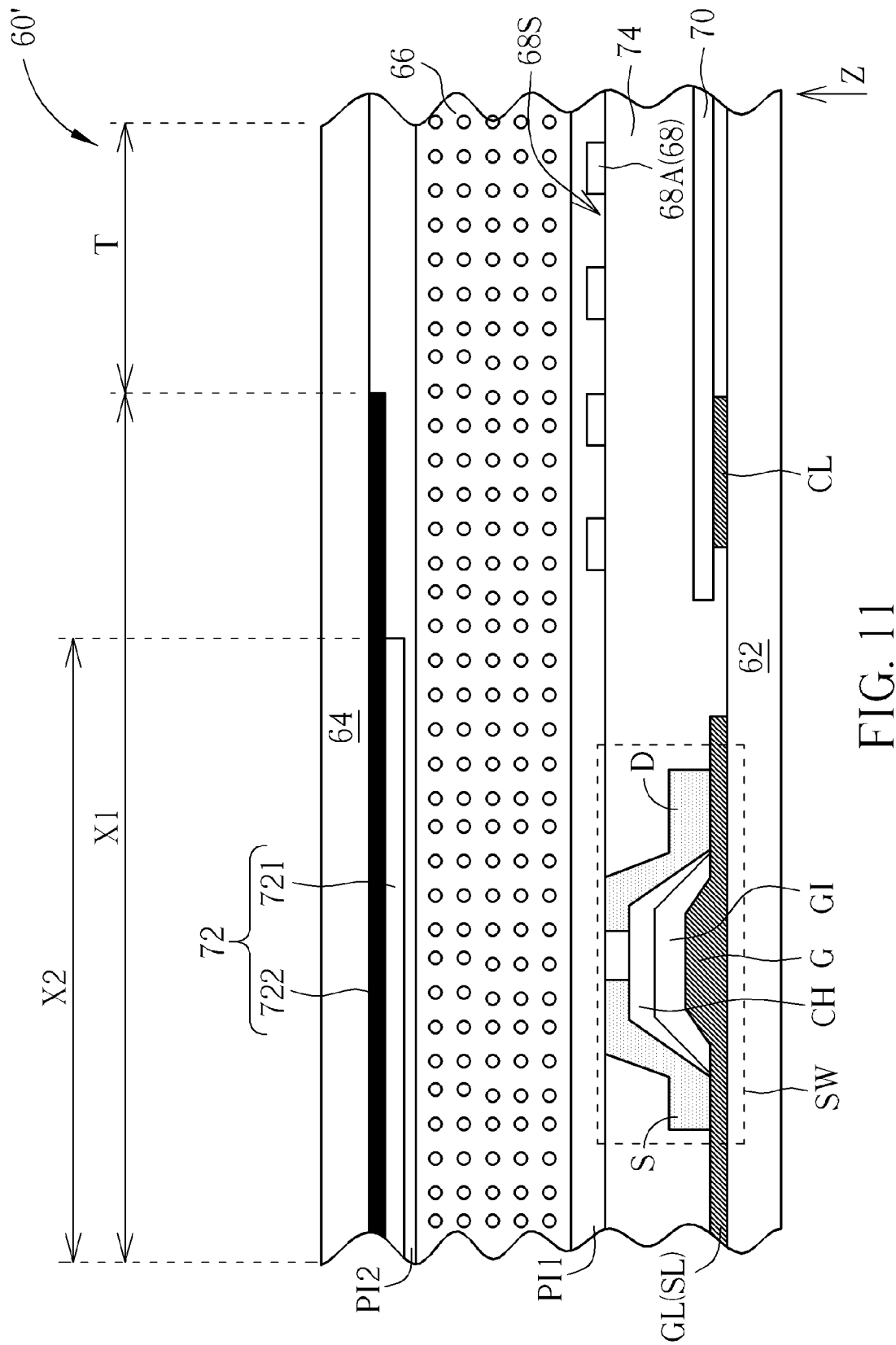
FIG. 11 is a schematic diagram illustrating a display panel according to a first alternative embodiment of the third embodiment of the present disclosure.

Refer to FIG. 11. FIG. 11 is a schematic diagram illustrating a display panel according to a first alternative embodiment of the third embodiment of the present disclosure. As shown in FIG. 11, different from the third embodiment, in the display panel 60' of the first alternative embodiment, the transparent electrode layer 721 extends toward the light-transmitting region T and protrudes the gate electrode G, but does not overlap the common line CL. Specifically, the light-shielding layer 722 overlaps the active switching device SW, the gate line GL, the data line DL and the common line CL in the vertical projection direction Z, the transparent electrode layer 721 extends toward the light-transmitting region T and protrudes the gate electrode G or the gate line GL, and the width X1 of the light-shielding layer 722 is greater than the width X2 of the transparent electrode layer 721. It is appreciated that in the embodiments of FIGS. 8 and 10A-10E, the light-blocking stacking layer 72 overlaps the active switching device SW, the signal line SL and the common line CL in the vertical projection direction Z, but exposes the light-transmitting region T. That is to say, the light-blocking stacking layer 72, particularly the transparent electrode layer 721, does not exist in the light-transmitting region T, and thus the aperture ratio or the light transmittance is improved. In case the light-blocking stacking layer 72 overlaps the pixel electrode 68 in the light-transmitting region T, the ratio of the overlapping area of the pixel electrode 68 and the light-blocking stacking layer 72 to the overall area of the pixel electrode 68 is relatively low, which is substantially less than 40% and greater than 0%.

Figure 12:
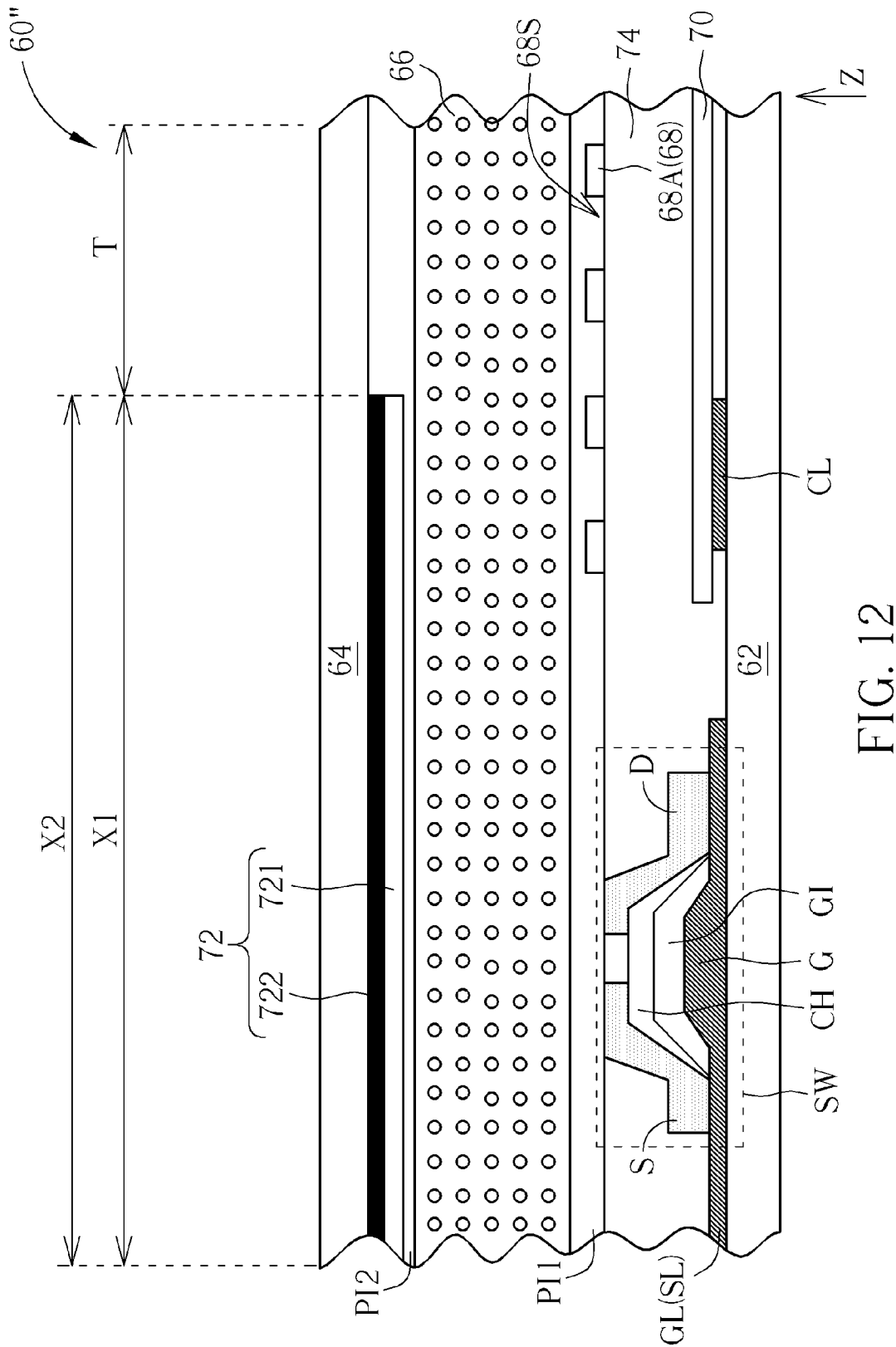
FIG. 12 is a schematic diagram illustrating a display panel according to a second alternative embodiment of the third embodiment of the present disclosure.

Refer to FIG. 12. FIG. 12 is a schematic diagram illustrating a display panel according to a second alternative embodiment of the third embodiment of the present disclosure. As shown in FIG. 12, different from the third embodiment, in the display panel 60" of the first alternative embodiment, the transparent electrode layer 721 extends toward the light-transmitting region T and protrudes the gate electrode G, and the transparent electrode layer 721 overlaps the common line CL. In other words, the width X1 of the light-shielding layer 722 is substantially equal to the width X2 of the transparent electrode layer 721, and both the transparent electrode layer 721 and the light-shielding layer 722 overlap the active switching device SW, the gate line GL and/or the data line DL and the common line CL in the vertical projection direction Z. In this embodiment, the voltage difference between the transparent electrode layer 721 and the gate electrode G of the active switching device SW forms a vertical electric field, which can drives the liquid crystal molecules disposed between the transparent electrode layer 721 and the gate electrode G to incline. In addition, the voltage difference between the transparent electrode layer 721 and the pixel electrode 68 disposed on the common line CL forms a vertical electric field, which can drives the liquid crystal molecules disposed between the transparent electrode layer 721 and the pixel electrode 68 disposed on the common line CL to incline. Therefore, the light leakage between the common line CL and the gate line GL in the side view direction is shielded. In this embodiment, the pixel electrode 68 is disposed on the common electrode 70, the pixel electrode 68 is a patterned electrode, and the common electrode 70 is a full surface electrode (or namely plane electrode). Most preferably, the pixel electrode 68 is disposed on the common electrode 70, and the common electrode 70 and the pixel electrode 68 may be both patterned electrodes arranged alternately as disclosed in the second alternative embodiment. More preferably, the common electrode 70 and the pixel electrode 68 are disposed at the same horizontal level and insulated in the horizontal direction, and the common electrode 70 and the pixel electrode 68 both may be patterned electrodes as disclosed in the third alternative embodiment. Alternatively, the pixel electrode 68 is disposed underneath the common electrode 70, the pixel electrode 68 is a full surface electrode (or namely plane electrode), and the common electrode 70 is a patterned electrode as disclosed in the first alternative embodiment. In the first alternative embodiment, the voltage difference between the transparent electrode layer 721 of the light-blocking stacking layer 72 and the pixel electrode 68 disposed on the common line CL forms a vertical electric field, which can drives the liquid crystal molecules disposed between the transparent electrode layer 721 and the pixel electrode 68 disposed on the common line CL to incline. However, since the pixel electrode 68 is disposed underneath the common electrode 70, the distance between the pixel electrode 68 and the transparent electrode layer 721 is farther in the first alternative embodiment than that in the second or third alternative embodiments. That is to say, the vertical electric field is weaker, and thus the liquid crystal molecules disposed between the transparent electrode layer 721 and the pixel electrode 68 are not inclined thoroughly. In such a case, the light leakage between the common line CL and the gate line GL in the side view direction is still effectively shielded.

Figure 13:
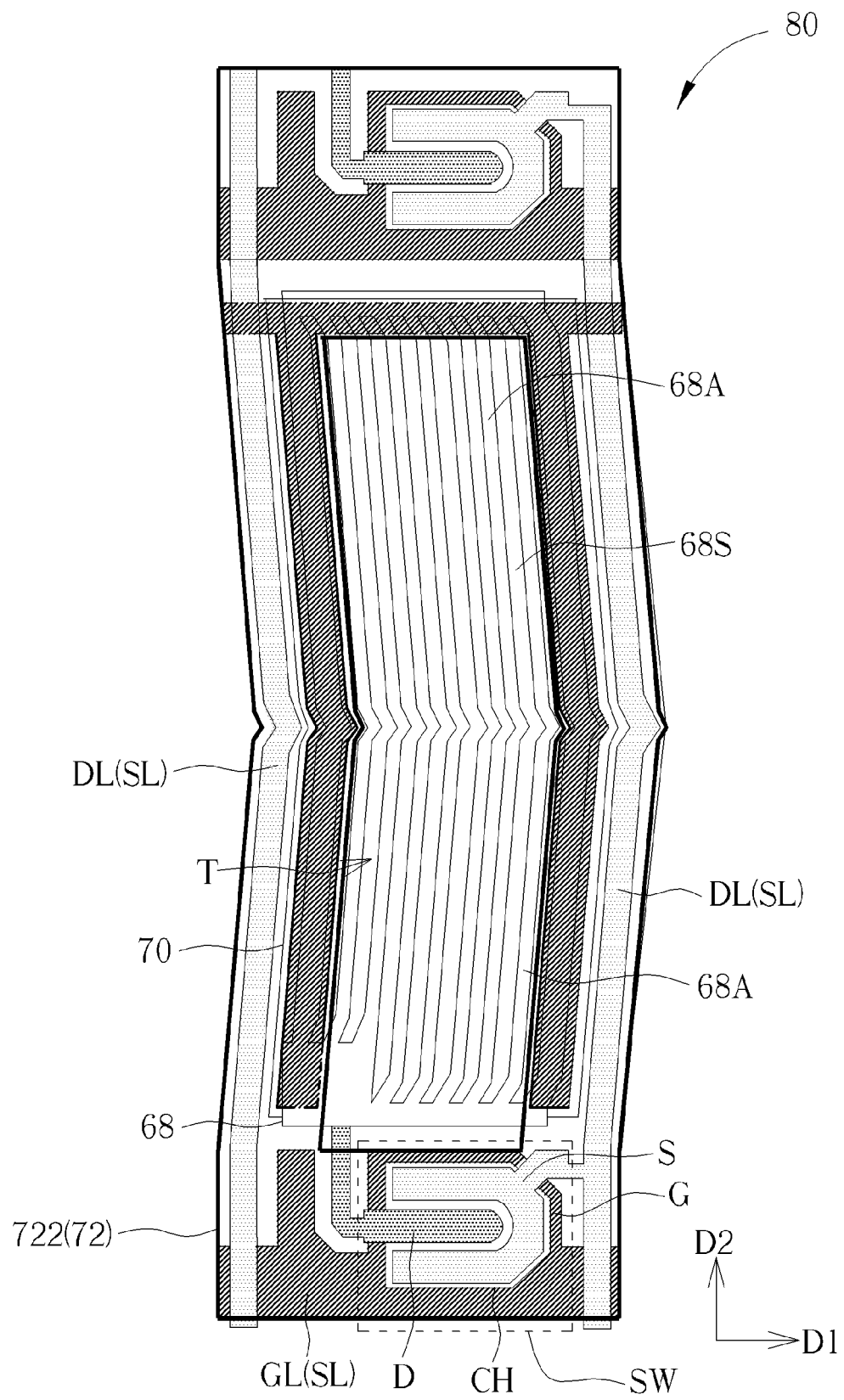
FIG. 13 is a schematic diagram illustrating a display panel according to a fourth embodiment of the present disclosure.

Refer to FIG. 13. FIG. 13 is a schematic diagram illustrating a display panel according to a fourth embodiment of the present disclosure. As shown in FIG. 13, in the display panel 80 of this embodiment, the branch electrodes 68A of the pixel electrode 68 are arranged along the second direction D2, instead of along the first direction D1. The branch electrodes 68A and the data line DL may have at least one turning part. In this embodiment, the shape of the common line CL may be modified as disclosed in the alternative embodiments of FIGS. 10A-10E, and the relation between the width of the light-shielding layer 722 and the width of the transparent electrode layer 721 of the light-blocking stacking layer 72 may be modified as disclosed in the embodiments of FIGS. 9, 11 and 12. Furthermore, transparent electrode layer 721 does not exist on (or namely is not disposed on) the effective light-transmitting region in FIGS. 9 to 13, for example.

Figure 14:
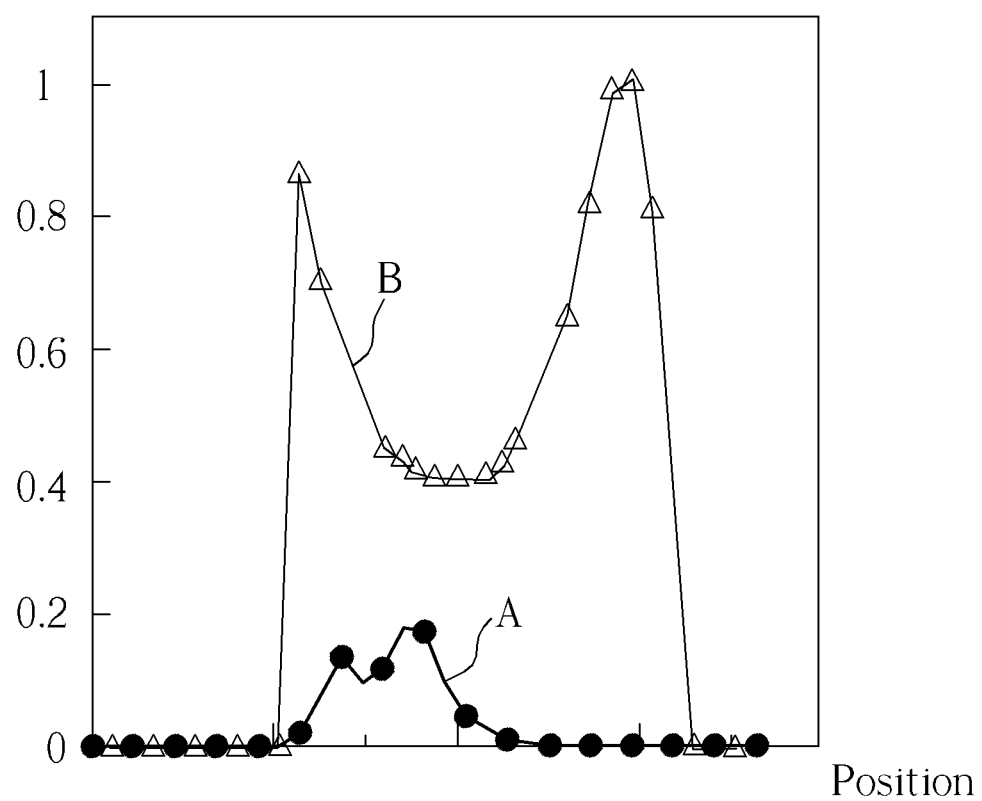
FIG. 14 is a simulation diagram of a normalized transmittance of a single sub-pixel of a display panel in a dark display mode according to an embodiment of the present disclosure.
Figure 15:
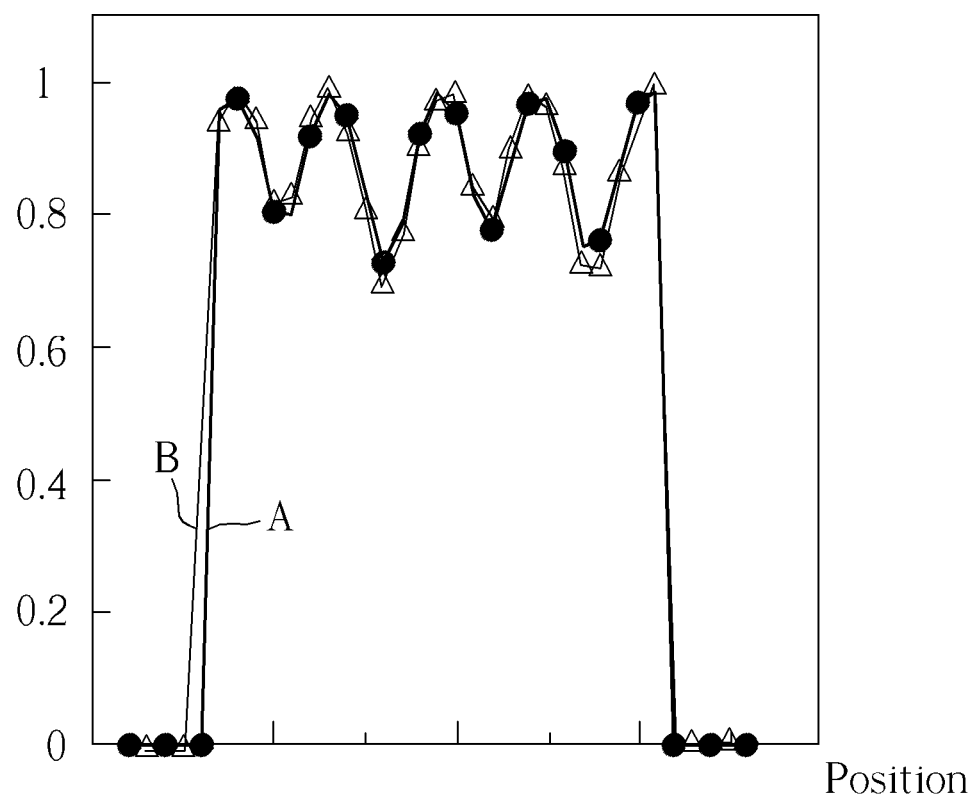
FIG. 15 is a simulation diagram of a normalized transmittance of a single sub-pixel of a display panel in a bright display mode according to an embodiment of the present disclosure.

Refer to FIG. 14 and FIG. 15. FIG. 14 is a simulation diagram of a normalized transmittance of a single sub-pixel of a display panel in a dark display mode according to an embodiment of the present disclosure, and FIG. 15 is a simulation diagram of a normalized transmittance of a single sub-pixel of a display panel in a bright display mode according to an embodiment of the present disclosure, wherein curve A represents the relation of the normalized transmittance and the position of the display panel of the present disclosure, and curve B represents the relation of the normalized transmittance and the position of the display panel of a control embodiment. The normalized transmittance is unit free, and the light within visible wavelength range is measured but the wavelength of the light is not limited to single wavelength. The position is measured in the location where the light-blocking stacking layer 72 is disposed and corresponding to the gate line GL and the active switching device SW, the unit of the position is micrometer, and the position is measured from 0 micrometer to 68 micrometers. The display panel of the control embodiment is selected from the display panel of FIG. 9, but without the light-blocking stacking layer 72 formed on the second substrate 64. As shown in FIG. 14, in the dark display mode (target grayscale is approximately 0), the normalized transmittance of the display panel of this embodiment (curve A) is significantly lower than the normalized transmittance of the display panel of the control embodiment (curve B), which proves the light-blocking stacking layer has significant light-shielding effect. As shown in FIG. 15, in the bright display mode (target grayscale is approximately 255), the normalized transmittance of the display panel of this embodiment (curve A) is insignificantly different from the normalized transmittance of the display panel of the control embodiment (curve B), which proves the light-blocking stacking layer does not affect the brightness in the bright display mode.

In conclusion, the display panel of the present disclosure includes a light-blocking stacking layer which includes a light-shielding layer and a transparent electrode layer. The light-shielding layer is configured to shielding the light leakage between the common line and the signal line (e.g. the gate line and/or the data line) in the front view direction. The transparent electrode layer and the gate electrode of the active switching device have a voltage difference forming a vertical electric field, which can drives the liquid crystal molecules disposed between the transparent electrode layer and the gate electrode to incline. Therefore, the light leakage between the common line and the signal line (e.g. the gate line and/or the data line) in the side view direction is shielded. Moreover, the transparent electrode layer and the pixel electrode disposed on the common line also have a voltage difference forming a vertical electric field, which can drives the liquid crystal molecules disposed between the transparent electrode layer and the pixel electrode disposed on the common line to incline. Therefore, the light leakage between the common line and the gate line in the side view direction is shielded. The light-blocking stacking layer is proved to be able to effectively shield light leakage in the dark display mode without affecting the brightness in the bright display mode.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:
1. A display panel, comprising:
   a first substrate structure comprising:
      a first substrate;
      a first common electrode, disposed on the first substrate;
      a pixel electrode, disposed on the first common electrode, the pixel electrode and the first common electrode being spaced and separated from each other; and
      a first alignment film, disposed on the pixel electrode;
   a second substrate structure, disposed opposite to the first substrate structure, the second substrate structure comprising:
      a second substrate;
      a second common electrode, disposed on the second substrate; and
      a second alignment film, disposed on the second common electrode; and
   a non-self-luminous display medium layer, disposed between the first alignment film and the second alignment film, wherein a first capacitance exists between the first common electrode and the pixel electrode, a second capacitance exists between the second common electrode and the pixel electrode, and a ratio of the second capacitance to the first capacitance is substantially between 0.7 and 1.3.

2. The display panel of claim 1, wherein the ratio of the second capacitance to the first capacitance is substantially equal to 1.

3. The display panel of claim 1, wherein the first substrate structure further comprises:
an insulation layer, disposed on the first substrate, wherein the insulation layer is disposed on the first common electrode; and
a passivation layer, disposed on the insulation layer, wherein the pixel electrode is disposed on the passivation layer, the passivation layer comprises a first passivation layer and a second passivation layer, a dielectric constant of the first passivation layer is substantially greater than a dielectric constant of the second passivation layer, and the dielectric constant of the second passivation layer is substantially less than 5.

4. The display panel of claim 3, wherein the insulation layer has a first sub-capacitor, the first passivation layer has a second sub-capacitor, the second passivation layer has a third sub-capacitor, the first sub-capacitor, the second sub-capacitor and the third sub-capacitor are connected in series, an equivalent capacitance sum of the first sub-capacitor, the second sub-capacitor and the third sub-capacitor are substantially equal to the first capacitance, the first alignment film has a fourth sub-capacitor, the non-self-luminous display medium layer has a fifth sub-capacitor, the second alignment film has a sixth sub-capacitor, the fourth sub-capacitor, the fifth sub-capacitor and the sixth sub-capacitor are connected in series, and an equivalent capacitance sum of the fourth sub-capacitor, the fifth sub-capacitor and the sixth sub-capacitor are substantially equal to the second capacitance.

5. The display panel of claim 1, wherein the first substrate structure comprises:
an insulation layer, disposed on the first substrate, wherein the first common electrode is disposed on the insulation layer; and
a passivation layer, disposed on the insulation layer and covering the first common electrode, wherein the pixel electrode is disposed on the passivation layer, the passivation layer comprises a first passivation layer and a second passivation layer, a dielectric constant of the first passivation layer is substantially greater than a dielectric constant of the second passivation layer, and the dielectric constant of the second passivation layer is substantially less than 5.

6. The display panel of claim 5, wherein the first passivation layer has a first sub-capacitor, the second passivation layer has a second sub-capacitor, the first sub-capacitor and the second sub-capacitor are connected in series, an equivalent capacitance sum of the first sub-capacitor and the second sub-capacitor are substantially equal to the first capacitance, the first alignment film has a third sub-capacitor, the non-self-luminous display medium layer has a fourth sub-capacitor, the second alignment film has a fifth sub-capacitor, the third sub-capacitor, the fourth sub-capacitor and the fifth sub-capacitor are connected in series, and an equivalent capacitance sum of the third sub-capacitor, the fourth sub-capacitor and the fifth sub-capacitor are substantially equal to the second capacitance.

7. The display panel of claim 1, wherein the non-self-luminous display medium layer comprises a negative type liquid crystal layer, and a dielectric anisotropy of the negative type is less than 0.

8. The display panel of claim 1, wherein a cell gap exists between the first substrate structure and the second substrate structure, the non-self-luminous display medium layer has a birefringence ($\Delta n$), and a product of the cell gap and the birefringence is substantially between 0.15 micrometers and 0.5 micrometers.

9. The display panel of claim 1, wherein the first substrate structure further comprises:
an active switching device, disposed on the first substrate, wherein the active switching device is electrically connected to the pixel electrode; and
a common line, disposed on the first substrate and electrically connected to the first common electrode.

10. The display panel of claim 1, wherein the pixel electrode comprises a plurality of branch electrodes, and a slit exists between two adjacent branch electrodes.

11. The display panel of claim 10, wherein each of the branch electrodes has a first width, each of the slits has a second width, and a ratio of the first width to the second width is substantially between 1:1 and 1:3.

12. The display panel of claim 1, wherein the second substrate structure further comprises a color filter, disposed on the second substrate.

13. A display panel, comprising:
a first substrate;
a second substrate, disposed opposite to the first substrate;
a non-self-luminous display medium layer, disposed between the first substrate and the second substrate;
a signal line, disposed on the first substrate;
an active switching device, disposed on the first substrate and electrically connected to the signal line;
a pixel electrode, disposed on the first substrate and electrically connected to the active switching device;
a common line, disposed on the first substrate,
a common electrode, disposed on the first substrate and electrically connected to the common line, wherein the common electrode and the pixel electrode are spaced from each other, and the pixel electrode and the common electrode together define a light-transmitting region; and
a light-blocking stacking layer, disposed on the second substrate, wherein the light-blocking stacking layer comprises a transparent electrode layer and a light-shielding layer, and the light-blocking stacking layer overlaps the active switching device, the signal line and the common line in a vertical projection direction but exposes at least part of the light-transmitting region in the vertical projection direction.

14. The display panel of claim 13, wherein the signal line comprises at least one of a gate line and a data line.

15. The display panel of claim 14, wherein the light-shielding layer of the light-blocking stacking layer overlaps the active switching device, the gate line and the common line in the vertical projection direction.

16. The display panel of claim 15, wherein the transparent electrode layer overlaps the active switching device and the gate line in the vertical projection direction, but does not overlap the common line in the vertical projection direction.

17. The display panel of claim 15, wherein the transparent electrode layer of the light-blocking stacking layer overlaps the active switching device, the gate line and the common line in the vertical projection direction.

18. The display panel of claim 13, wherein a width of the light-shielding layer is greater than or equal to a width of the transparent electrode layer.

19. The display panel of claim 13, wherein at least one of the pixel electrode and the common electrode comprises a plurality of slits.

20. The display panel of claim 13, wherein the light-blocking stacking layer overlaps part of the light-transmitting region and exposes another part of the light-transmitting region, and the transparent electrode layer does not exist on the exposed light-transmitting region.

21. A display panel, comprising:
a first substrate;
a second substrate, disposed opposite to the first substrate;
a non-self-luminous display medium layer, disposed between the first substrate and the second substrate;
a signal line, disposed on the first substrate;
an active switching device, disposed on the first substrate and electrically connected to the signal line;
a pixel electrode, disposed on the first substrate and electrically connected to the active switching device;
a common line, disposed on the first substrate,
a common electrode, disposed on the first substrate and electrically connected to the common line, wherein the common electrode and the pixel electrode are spaced from each other, and the pixel electrode and the common electrode together define a light-transmitting region; and
a light-blocking stacking layer, disposed on the second substrate, wherein the light-blocking stacking layer comprises a transparent electrode layer and a light-shielding layer, and the light-blocking stacking layer overlaps the active switching device, the signal line and the common line in a vertical projection direction and has no overlap with at least part of the light-transmitting region in the vertical projection direction.

22. The display panel of claim 21, wherein the signal line comprises at least one of a gate line and a data line.

23. The display panel of claim 22, wherein the light-shielding layer of the light-blocking stacking layer overlaps the active switching device, the gate line and the common line in the vertical projection direction.

24. The display panel of claim 23, wherein the transparent electrode layer overlaps the active switching device and the gate line in the vertical projection direction, but does not overlap the common line in the vertical projection direction.

25. The display panel of claim 23, wherein the transparent electrode layer of the light-blocking stacking layer overlaps the active switching device, the gate line and the common line in the vertical projection direction.

26. The display panel of claim 22, wherein a width of the light-shielding layer is greater than or equal to a width of the transparent electrode layer.

27. The display panel of claim 22, wherein at least one of the pixel electrode and the common electrode comprises a plurality of slits.

28. The display panel of claim 22, wherein the light-blocking stacking layer overlaps part of the light-transmitting region and does not overlap another part of the light-transmitting region, and the transparent electrode layer does not exist on the non-overlapped light-transmitting region.

* * * * *